US011376929B2

(12) United States Patent
Pennings et al.

(10) Patent No.: US 11,376,929 B2
(45) Date of Patent: Jul. 5, 2022

(54) LIFT TRUCK OPERATOR COMPARTMENT DOOR

(71) Applicant: Hyster-Yale Group, Inc., Fairview, OR (US)

(72) Inventors: Paul Pennings, Heeswijk-Dinther (NL); Chris van de Werdt, Beneden-Leeuwen (NL); Timo Kankaanpaa, Kurikka (FI); Juha Kauko, Helsinki (FI)

(73) Assignee: Hyster-Yale Group, Inc., Fairview, OR (US)

( * ) Notice: Subject to any disclaimer, the term of this patent is extended or adjusted under 35 U.S.C. 154(b) by 163 days.

(21) Appl. No.: 16/709,751

(22) Filed: Dec. 10, 2019

(65) Prior Publication Data

US 2021/0170841 A1   Jun. 10, 2021

(51) Int. Cl.
*B60J 5/04* (2006.01)
*B62D 33/06* (2006.01)
*B66F 9/075* (2006.01)

(52) U.S. Cl.
CPC ........ *B60J 5/0487* (2013.01); *B62D 33/0617* (2013.01); *B66F 9/0759* (2013.01); *B60J 5/0402* (2013.01); *B60J 5/048* (2013.01); *B60J 5/0419* (2013.01); *B60J 5/0434* (2013.01); *B66F 9/07545* (2013.01)

(58) Field of Classification Search
CPC ... B60J 5/0487; B62D 33/0617; B66F 9/0759
USPC .................................................. 296/190.11
See application file for complete search history.

(56) References Cited

U.S. PATENT DOCUMENTS

| 4,957,324 A | 9/1990 | Doescher et al. |
| 6,128,861 A * | 10/2000 | Calamari ............... B60J 5/0487 49/490.1 |

(Continued)

FOREIGN PATENT DOCUMENTS

| EP | 1081294 B1 | 12/2011 |
| JP | H07229349 A | 8/1995 |

(Continued)

OTHER PUBLICATIONS

Communication of the Extended European Search Report, dated Nov. 4, 2020.

*Primary Examiner* — Jason S Morrow
(74) *Attorney, Agent, or Firm* — Laurence & Phillips IP Law

(57) ABSTRACT

Lift trucks can have an operator compartment designed with an ergonomically improved cab door having a door frame, a set of glass sheets, upper and lower hinges, a handle, a door catch assembly, a door support member, and one or more operator handlebars. The door support member and operator handlebars can be sized and/or positioned to provide structural strength to the door. The cab door can have an unobstructed door design to facilitate maximum operator visibility. The catch assembly can maintain the door in an open position and the operator can readily close the door when desired. In one embodiment, the door includes a vertical operator handlebar and a horizontal operator handlebar that facilitate easy entry into and exit from the operator compartment without unduly obscuring operator visibility through the door.

30 Claims, 14 Drawing Sheets

(56) References Cited

U.S. PATENT DOCUMENTS

| | | | | |
|---|---|---|---|---|
| 6,561,572 | B1* | 5/2003 | Martin, Jr. | B62D 33/0621 |
| | | | | 296/190.1 |
| D577,040 | S | 9/2008 | Kim | |
| 8,496,282 | B2* | 7/2013 | Murakami | E05B 1/0015 |
| | | | | 296/65.05 |
| 8,905,173 | B2* | 12/2014 | Kimura | E02F 3/325 |
| | | | | 180/89.12 |
| 2009/0033105 | A1 | 2/2009 | Antonetti | |
| 2021/0246705 | A1* | 8/2021 | Kato | B60J 5/0487 |

FOREIGN PATENT DOCUMENTS

| | | |
|---|---|---|
| KR | 100780895 B1 | 11/2007 |
| KR | 101301574 B1 | 9/2013 |
| KR | 101367776 B1 | 2/2014 |
| KR | 101482169 B1 | 1/2015 |

* cited by examiner

LIFT TRUCK OPERATOR COMPARTMENT DOOR

TECHNICAL FIELD

The field of this disclosure relates generally to material handling vehicles. More specifically, this disclosure relates to an operator ingress/egress door for an operator compartment of a lift truck.

BACKGROUND INFORMATION

Lift trucks, including forklift trucks, are commonly used in manufacturing, shipping and warehousing facilities to lift and to transport materials. Lift trucks incorporate multiple components such as a power source, one or more counterweights, a steering assembly, axles, wheels and tires, an enclosed operator compartment or "cab," and a lift assembly, all supported by the truck's frame. Lift trucks are ideally small and agile, have a small turning radius and compact footprint, and are able to repeatedly lift thousands of pounds of materials. Heavy lift trucks, which can lift and/or transport materials weighing up to about 52 tons, may have a cab floor height that is typically about 4-8 feet above the ground, resulting from vertically stacking the truck components in order to maintain a compact footprint. Lift trucks can be used outdoors and may be exposed to extreme weather conditions, including strong winds. An operator (also referred to as a "driver") controls the lift truck from the cab, often for multiple hours at a time, and may frequently enter and exit the cab to manually handle or adjust the materials that are being transported. The operator may also need to frequently communicate with personnel who are located outside the truck.

Conventional truck designs often will compromise the ergonomics of the operator compartment. For example, operators of heavy lift trucks may need to traverse up multiple steps to reach the cab, which can make it unduly burdensome for an operator to quickly and easily step into and out of the cab. A high cab floor height also raises the elevation of truck components that are located on or above the floor, such as the operator seat and door assembly. Such elevated placement can hamper visibility if the view from the operator's seat is limited, as well as impede the operator when moving into, out of, or within the operator compartment. A high cab floor may also affect communication between the operator and personnel on the ground during operation of the truck, as it may be necessary for the operator to manually open the door in order to readily converse with coworkers. In harsh weather conditions, opening the door could allow rain or snow to enter the cab. High winds can grab a partially open door and cause the door to forcefully crash against the cab frame, resulting in shattering the glass within the door, deforming the door itself, or both.

FIGS. 1A and 1B are isometric illustrations of a conventional lift truck 100 showing the left cab door closed and open, respectively. Components of the conventional lift truck 100 include an operator cab 110, a mast 170, a truck frame 180, and multiple steps 190 to provide an operator access to the cab 110. The cab 110 has a door 120 with at least one glass sheet 130 and a horizontal support member 140. The horizontal support member 140 provides structural strength to the door 120 but can interfere with the line of sight between an operator in the cab 110 and other people or items outside of the conventional lift truck 100.

Overview of Disclosure

One aspect of this disclosure relates to lift trucks designed to provide an operator with a cab having minimally obstructed views to the areas surrounding the truck while sheltering the operator from harsh exterior environments. An additional aspect relates to lift trucks that incorporate convenient operator accessibility features. A further aspect relates to providing a driver with ergonomic cab features for productive truck operation.

It is desirable to design a lift truck such that the lift truck operator has views from the cab with minimal or no obstructions. This can be achieved, for example, by incorporating cab door components that are sized and positioned to minimize visual obstruction by an operator seated in the operator cab looking through the door. An aspect of an ergonomic operator compartment can be achieved by ensuring that the cab door components are additionally sized and positioned to optimize operator comfort during use. In addition, it is beneficial for an operator to enter and exit the cab of the lift truck via a three-point access system having ergonomic handles that is designed to accommodate a range of operators having varying heights and ranges of motion. In the absence of an ergonomically designed lift truck, operator comfort and productivity may suffer. The operator's comfort and visibility while inside the cab, and ease of physically entering and exiting the operator compartment, are relevant to efficient material transport.

One embodiment is a door for an operator cab of a lift truck, the operator cab including a cab frame and the door. The door includes a door frame defining periphery edges of the door. The door frame can include a substantially vertical peripheral edge on an attachment side of the door, a peripheral edge opposite the attachment edge and on a swinging-open side of the door, a substantially horizontal upper peripheral edge, and a substantially horizontal lower peripheral edge. The door frame can include a set of glass sheets that are attached to the door frame. The door frame can include a substantially horizontal support member connected to the peripheral edge opposite the attachment edge, the support member being sized and positioned to minimize visual obstruction of an operator seated in the operator cab looking through the door. The door frame can include an upper hinge connection area in proximity to the substantially vertical peripheral edge on the attachment side of the door. The door frame can include a lower hinge connection area in proximity to the substantially vertical peripheral edge on the attachment side of the door. The door frame can include a first hinge connected to the upper hinge connection area and to the operator cab and a second hinge connected to the lower hinge connection area and to the operator cab, whereby the door frame can rotate about a substantially vertical axis adjacent to and parallel with the substantially vertical peripheral edge on the attachment side of the door. The door frame can include a catch assembly comprising a knob on the door and a bracket connected to the cab, the bracket configured to engage with the knob to thereby hold the door in an open position and to disengage from the knob to facilitate closing the door. The door frame can include a door handle connected to the door in proximity to the peripheral edge opposite the attachment edge on the swinging-open side of the door. The door frame can include a vertical operator handlebar connected to the door frame and providing structural strength to the door frame, the vertical operator handlebar positioned in proximity to the substantially vertical peripheral edge on the attachment side of the door so as to not unduly visually obscure sight through the door. The door frame can include a horizontal operator handlebar connected to the door frame and providing structural strength to the door frame, the horizontal operator handlebar positioned in proximity to the support member so as to not appreciably visually obscure sight through the door more than the support member.

Another embodiment is a lift truck having an operator cab which includes a cab frame and a door. The door includes a door frame defining periphery edges of the door. The door frame can include one or more of the following: (a) a substantially vertical peripheral edge on an attachment side of the door, a peripheral edge opposite the attachment edge and on a swinging-open side of the door, a substantially horizontal upper peripheral edge, and a substantially horizontal lower peripheral edge; (b) a set of glass sheets that are attached to the door frame; (c) a substantially horizontal support member connected to the peripheral edge opposite the attachment edge, the support member being sized and positioned to minimize visual obstruction of an operator seated in the operator cab looking through the door; (d) an upper hinge connection area in proximity to the substantially vertical peripheral edge on the attachment side of the door; (e) a lower hinge connection area in proximity to the substantially vertical peripheral edge on the attachment side of the door; (f) a first hinge connected to the upper hinge connection area and to the operator cab and a second hinge connected to the lower hinge connection area and to the operator cab, whereby the door frame can rotate about a substantially vertical axis adjacent to and parallel with the substantially vertical peripheral edge on the attachment side of the door; (g) a catch assembly comprising a knob on the door and a bracket connected to the cab, the bracket configured to engage with the knob to thereby hold the door in an open position and to disengage from the knob to facilitate closing the door; (h) a door handle connected to the door in proximity to the peripheral edge opposite the attachment edge on the swinging-open side of the door; (i) a vertical operator handlebar connected to the door frame and providing structural strength to the door frame, the vertical operator handlebar positioned in proximity to the substantially vertical peripheral edge on the attachment side of the door so as to not unduly visually obscure sight through the door; and (j) a horizontal operator handlebar connected to the door frame and providing structural strength to the door frame, the horizontal operator handlebar positioned in proximity to the support member so as to not appreciably visually obscure sight through the door more than the support member.

Another embodiment is a door for an operator cab of a lift truck, the operator cab including a cab frame and the door. The door includes a door frame defining periphery edges of the door. The door frame can include a substantially vertical peripheral edge on an attachment side of the door, a peripheral edge opposite the attachment edge and on a swinging-open side of the door, a substantially horizontal upper peripheral edge, and a substantially horizontal lower peripheral edge. The door frame can include a set of glass sheets that are attached to the door frame. The door frame can include a substantially horizontal support member connected to the peripheral edge opposite the attachment edge, the support member being sized and positioned to minimize visual obstruction of an operator seated in the operator cab looking through the door. The door frame can include an upper hinge connection area in proximity to the substantially vertical peripheral edge on the attachment side of the door. The door frame can include a lower hinge connection area in proximity to the substantially vertical peripheral edge on the attachment side of the door. The door frame can include a first hinge connected to the upper hinge connection area and to the operator cab and a second hinge connected to the lower hinge connection area and to the operator cab, whereby the door frame can rotate about a substantially vertical axis adjacent to and parallel with the substantially vertical peripheral edge on the attachment side of the door. The door frame can include a catch assembly comprising a knob on the door and a bracket connected to the cab, the bracket configured to engage with the knob to thereby hold the door in an open position and to disengage from the knob to facilitate closing the door. The door frame can include a door handle connected to the door in proximity to the peripheral edge opposite the attachment edge on the swinging-open side of the door. The door frame can include a vertical operator handlebar connected to the door frame and providing structural strength to the door frame, the vertical operator handlebar positioned in proximity to the substantially vertical peripheral edge on the attachment side of the door so as to not visually obscure sight through the door in a planar surface area that is more than about 15% of the total planar surface area of the door. The door frame can include a horizontal operator handlebar connected to the door frame and providing structural strength to the door frame, the horizontal operator handlebar positioned in proximity to the support member so as to not visually obscure sight through the door in a planar surface area that is more than about 15% of the total planar surface area of the door.

Another embodiment is a lift truck having an operator cab which includes a cab frame and a door. The door includes a door frame defining periphery edges of the door. The door frame can include one or more of the following: (a) a substantially vertical peripheral edge on an attachment side of the door, a peripheral edge opposite the attachment edge and on a swinging-open side of the door, a substantially horizontal upper peripheral edge, and a substantially horizontal lower peripheral edge; (b) a set of glass sheets that are attached to the door frame; (c) a substantially horizontal support member connected to the peripheral edge opposite the attachment edge, the support member being sized and positioned to minimize visual obstruction of an operator seated in the operator cab looking through the door; (d) an upper hinge connection area in proximity to the substantially vertical peripheral edge on the attachment side of the door; (e) a lower hinge connection area in proximity to the substantially vertical peripheral edge on the attachment side of the door; (f) a first hinge connected to the upper hinge connection area and to the operator cab and a second hinge connected to the lower hinge connection area and to the operator cab, whereby the door frame can rotate about a substantially vertical axis adjacent to and parallel with substantially vertical peripheral edge on the attachment side of the door; (g) a catch assembly comprising a knob on the door and a bracket connected to the cab, the bracket configured to engage with the knob to thereby hold the door in an open position and to disengage from the knob to facilitate closing the door; (h) a door handle connected to the door in proximity to the peripheral edge opposite the attachment edge on the swinging-open side of the door; (i) a vertical operator handlebar connected to the door frame and providing structural strength to the door frame, the vertical operator handlebar positioned in proximity to the substantially vertical peripheral edge on the attachment side of the door so as to not visually obscure sight through the door in a planar surface area that is more than about 15% of the total planar surface area of the door; and (j) a horizontal operator handlebar connected to the door frame and providing structural strength to the door frame, the horizontal operator handlebar positioned in proximity to the support member so as to not visually obscure sight through the door in a planar surface area that is more than about 15% of the total planar surface area of the door.

Another embodiment is a door for an operator cab of a lift truck, the operator cab including a cab frame and the door. The door can be sized and shaped to fit in the opening of the cab frame. The door can include a door frame defining periphery edges of the door. The door frame can include a substantially vertical peripheral attachment edge on an attachment side of the door, a peripheral edge opposite the attachment edge and on a swinging-open side of the door, a substantially horizontal upper peripheral edge, and a substantially horizontal lower peripheral edge. The door frame can include a substantially horizontal support member connected to the peripheral edge opposite the attachment edge. The door frame can include a set of glass sheets attached to the door frame. The door frame can include an upper hinge connecting the attachment side of the door to the operator cab. The door frame can include a lower hinge connecting the attachment side of the door to the operator cab. The door frame can include a catch assembly comprising a knob on the door and a bracket connected to the cab frame, the bracket configured to engage with the knob to thereby hold the door in an open position and to disengage from the knob to facilitate closing the door. The door frame can include a door handle connected to the door in proximity to the peripheral edge opposite the attachment edge on the swinging-open side of the door. The door frame can include a vertical operator handlebar connected to the door frame and providing structural strength to the door frame. The door frame can include a horizontal operator handlebar connected to the door frame and providing structural strength to the door frame.

Another embodiment is a lift truck having an operator cab which includes a cab frame and a door. The door can be sized and shaped to fit in the opening of the cab frame. The door can include a door frame defining periphery edges of the door. The door frame can include one or more of the following: (a) a substantially vertical peripheral attachment edge on an attachment side of the door, a peripheral edge opposite the attachment edge and on a swinging-open side of the door, a substantially horizontal upper peripheral edge, and a substantially horizontal lower peripheral edge; (b) a substantially horizontal support member connected to the peripheral edge opposite the attachment edge; (c) a set of glass sheets attached to the door frame; (d) an upper hinge connecting the attachment side of the door to the operator cab; (e) a lower hinge connecting the attachment side of the door to the operator cab; (f) a catch assembly comprising a knob on the door and a bracket connected to the cab frame, the bracket configured to engage with the knob to thereby hold the door in an open position and to disengage from the knob to facilitate closing the door; (g) a door handle connected to the door in proximity to the peripheral edge opposite the attachment edge on the swinging-open side of the door; (h) a vertical operator handlebar connected to the door frame and providing structural strength to the door frame; and (i) a horizontal operator handlebar connected to the door frame and providing structural strength to the door frame.

In some additional, alternative, or selectively cumulative embodiments, the door frame does not substantially deform when the door is in the open position and the knob is engaged with the bracket, upon exposure to wind having a speed of about 80 kph that is blowing in a direction substantially parallel to the door opening of the operator compartment.

In some additional, alternative, or selectively cumulative embodiments, the knob includes a pin having a head portion and a neck portion, and the bracket includes a collar that is configured to engage with the head and neck portions of the pin to thereby hold the door in an open position and to disengage from the knob when the head and neck portions of the pin are released from the collar to thereby close the door.

In some additional, alternative, or selectively cumulative embodiments, the door frame includes a catch release lever that is connected to the pin such that depression of the lever moves the collar from engaging the head and neck portions of the pin, to disengaging the head and neck portions of the pin to thereby separate the knob from the bracket.

In some additional, alternative, or selectively cumulative embodiments, the vertical operator handlebar includes the catch release lever.

In some additional, alternative, or selectively cumulative embodiments, the opening angle of the door, when the door is in the open position and the knob is engaged with the bracket, is between about 155 degrees and about 165 degrees.

In some additional, alternative, or selectively cumulative embodiments, the view from the operator compartment through the door when the door is in a closed position, is unobstructed over about 75% of the total planar surface area of the door.

In some additional, alternative, or selectively cumulative embodiments, the view from the operator compartment through the door when the door is in a closed position, is unobstructed over about 85% of the total planar surface area of the door.

In some additional, alternative, or selectively cumulative embodiments, the view from the operator compartment through the door when the door is in a closed position, is unobstructed over about 75% of the total planar surface area of the door.

In some additional, alternative, or selectively cumulative embodiments, the view from the operator compartment through the door when the door is in a closed position, is unobstructed over about 85% of the total planar surface area of the door.

In some additional, alternative, or selectively cumulative embodiments, the door frame further includes a sliding window including glass and a window actuator, the window positioned vertically between the upper hinge and the lower hinge of the door casing, wherein the window actuator is accessible from the operator compartment to slidably move the window in a substantially horizontal direction that is parallel with the substantially horizontal upper peripheral edge of the door frame, to open or close the window.

In some additional, alternative, or selectively cumulative embodiments, the glass is tempered and has a thickness between about 3 and about 10 millimeters.

In some additional, alternative, or selectively cumulative embodiments, the door frame is made of steel.

In some additional, alternative, or selectively cumulative embodiments, the door frame includes steel.

In some additional, alternative, or selectively cumulative embodiments, the door frame includes a hollow core that is generally rectangular in shape when the frame is viewed in cross-section, the hollow core having a height that is between about 32 and 36 millimeters and a width that is between about 8 and 21 millimeters; and a groove that extends from an edge of the hollow core and that terminates in a retaining lip, the retaining lip having a length between about 5 and 15 millimeters.

In some additional, alternative, or selectively cumulative embodiments, the ratio of the thickness of the door frame and the thickness of the glass is between 1:1 and 1:5.

In some additional, alternative, or selectively cumulative embodiments, the lift truck has a lift capacity between about 8 and about 52 tons.

In some additional, alternative, or selectively cumulative embodiments, the cab includes a second opening for a second door on an opposite side of the cab from the first door, wherein the second door is sized and shaped to fit in the second opening of the cab frame. The second door can be substantially a mirror image of the first door.

In some additional, alternative, or selectively cumulative embodiments, the door and the second door are left and right doors.

In some additional, alternative, or selectively cumulative embodiments, each of the door and the second door do not substantially deform when the door is in the open position and the knob is engaged with the bracket, upon exposure to wind having a speed of about 80 kph that is blowing in a direction substantially parallel to the door openings of the operator compartment.

BRIEF DESCRIPTION OF THE DRAWINGS

FIG. 3 is a drawing of the interior side of the left cab door such as viewed from inside the cab when the door is closed, according to one embodiment.

FIG. 8 is a drawing of the exterior side of the left cab door such as viewed from outside the cab when the door is closed, according to one embodiment.

FIG. 9A represents the operator beginning to climb up and into the cab, and FIG. 9B represents an operator continuing to enter the cab of the lift truck of FIG. 9A.

DETAILED DESCRIPTION OF EMBODIMENTS

Figure 1A:
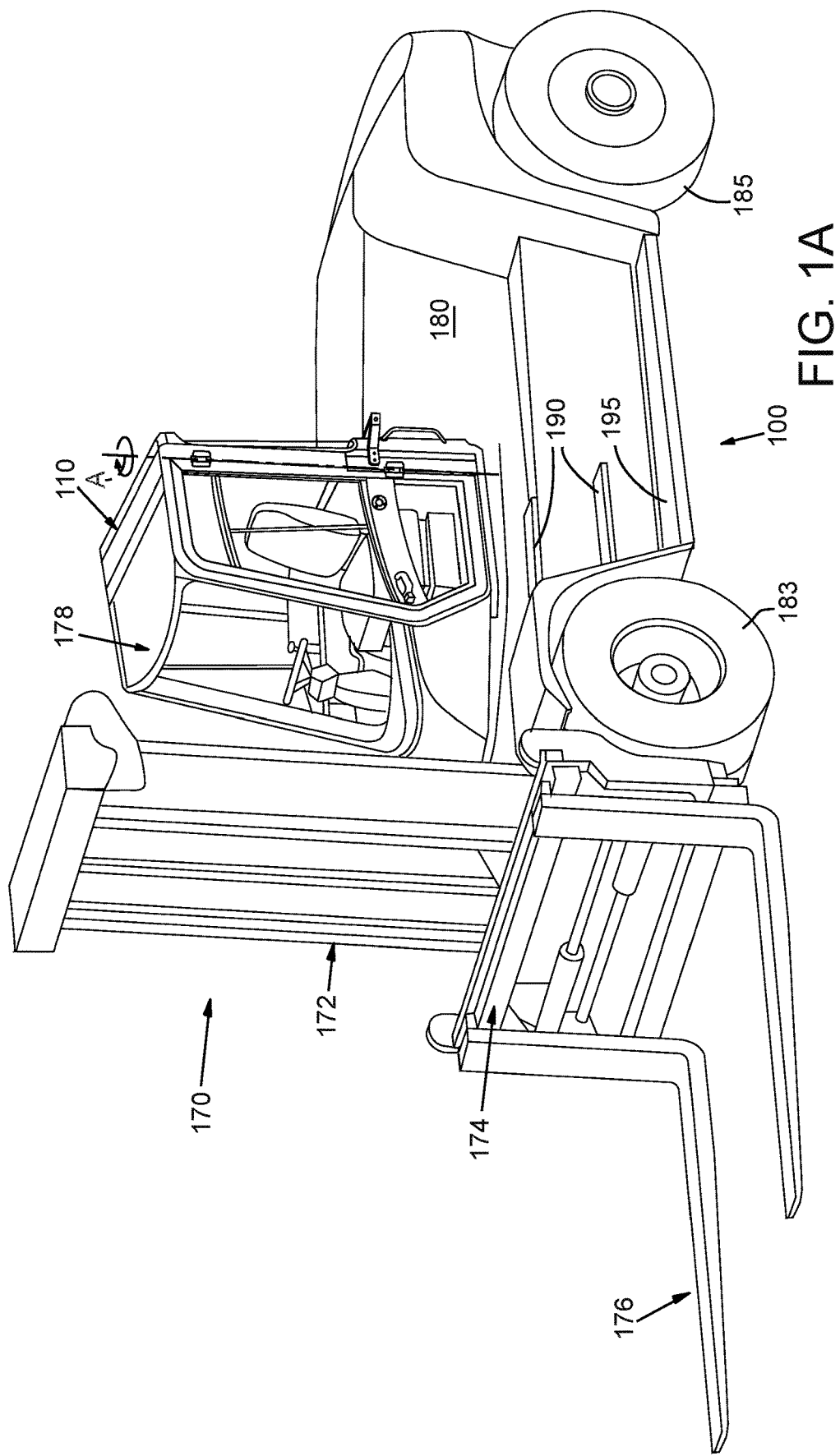
FIG. 1A is an isometric drawing of a conventional lift truck with the cab doors closed, from a front left perspective.

Example embodiments are described below with reference to the accompanying drawings. Unless otherwise expressly stated, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, are open-ended and specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

The embodiments described herein are merely examples, set forth by way of illustration only and not limitation. Those skilled in the art will recognize in light of the teachings herein that there are alternatives, variations and equivalents to the example embodiments described herein and their component parts. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in light of this disclosure, certain embodiments of the lift trucks and designs therefor that are disclosed herein may be capable of achieving certain advantages, including, in some cases, one or more of the following: (1) an operator door with multiple ergonometric handles to facilitate comfortable entry into the cab, exit from the cab, and operation of the truck within the cab; (2) an unobstructed door design to facilitate maximum operator visibility and minimize obstruction of operator visibility; (3) preserved and/or enhanced structural strength with minimal interior cross-support members that block operator vision; and (4) a catch assembly that permits the operator to maintain the door in an open position and to readily close the door when desired. The foregoing and other advantages of various embodiments will be apparent upon reading this document.

Figure 2A:
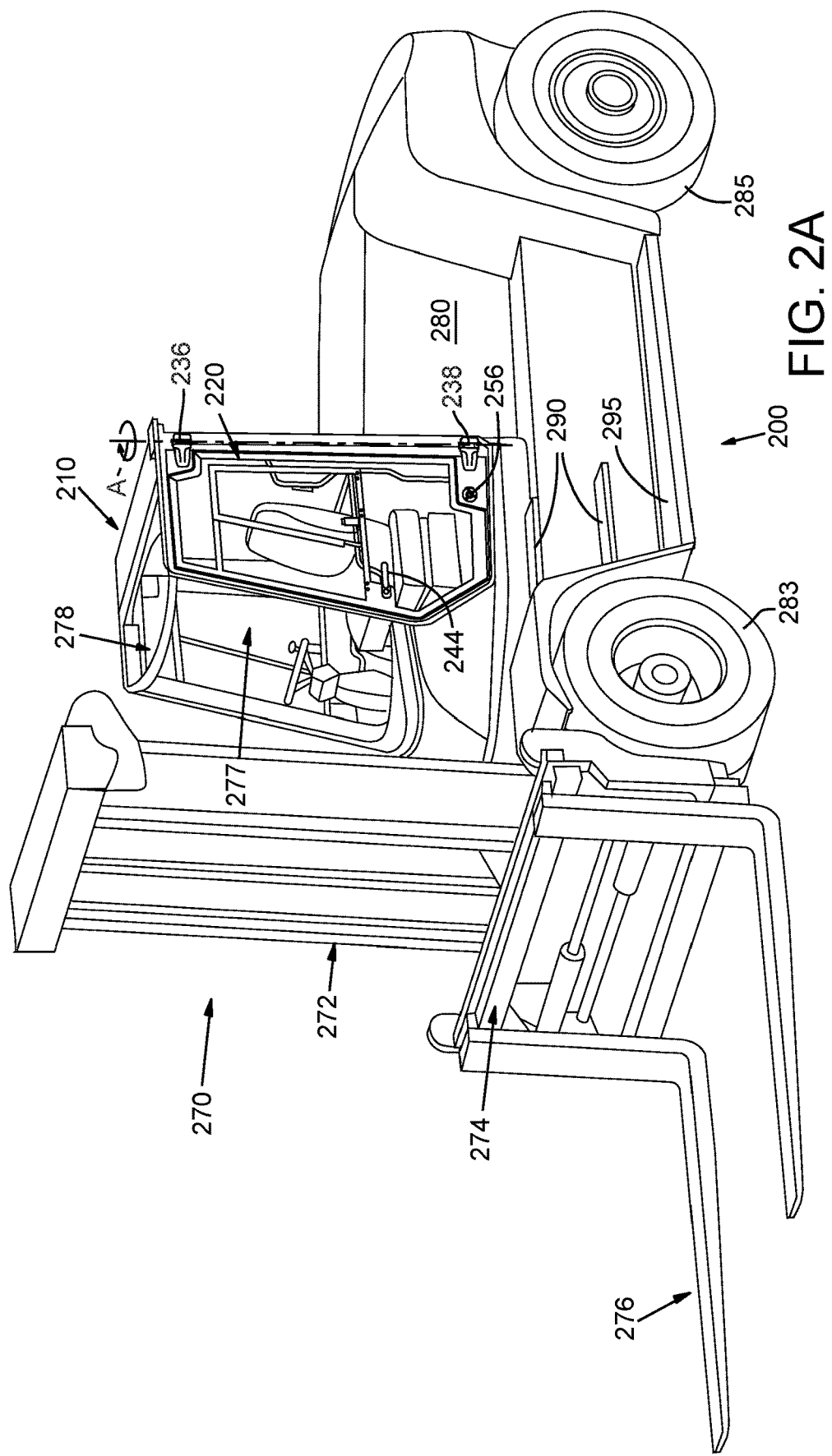
FIG. 2A is an isometric drawing of a lift truck with the cab doors closed, from a front left perspective, according one embodiment.
Figure 2B:
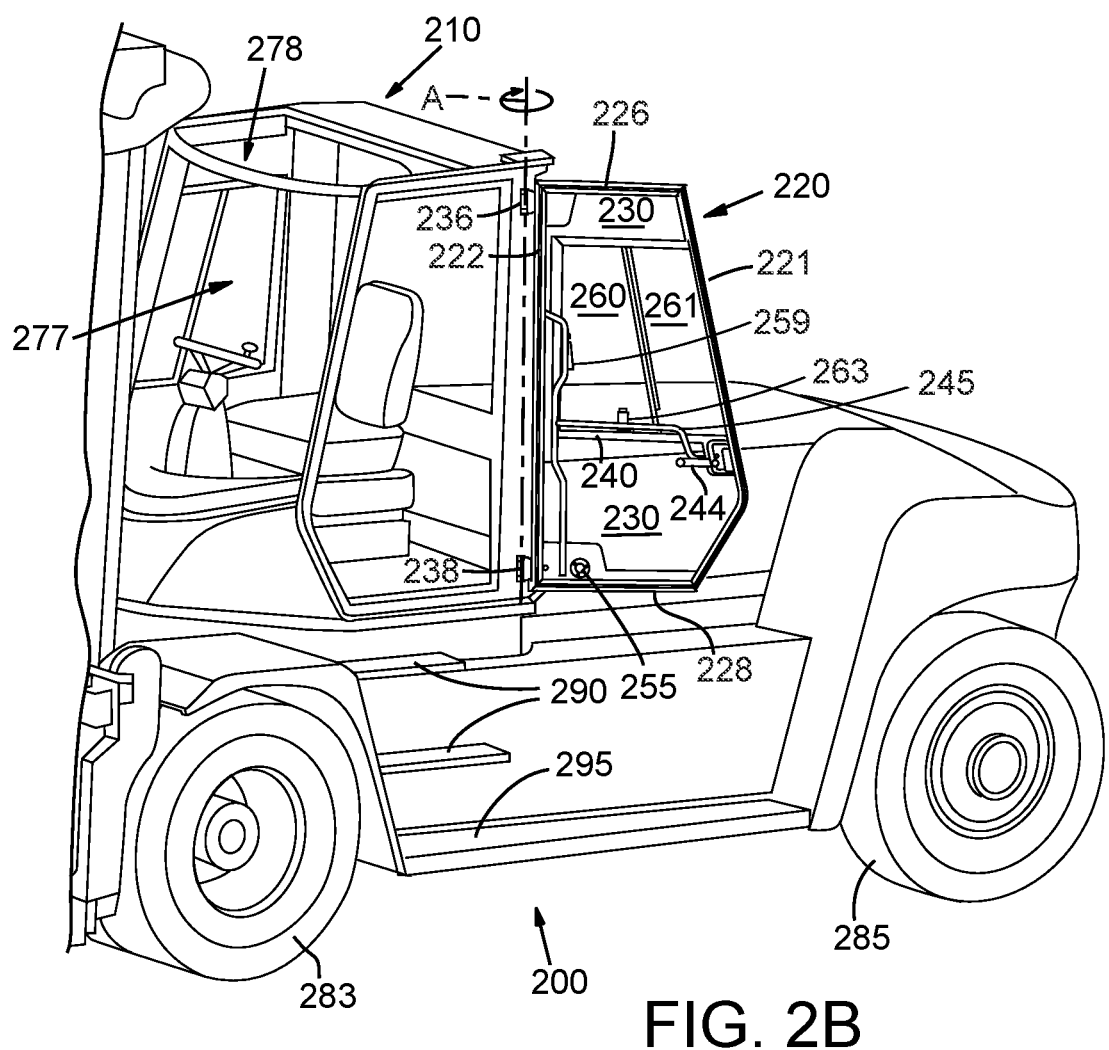
FIG. 2B is an isometric drawing of a lift truck with the left cab door open, from a front left perspective, according one embodiment, and with the mast removed for clarity.

FIGS. 2A and 2B are isometric illustrations of a lift truck 200 according to one embodiment, showing the left cab door closed and open, respectively. Referring to FIG. 2A, the lift truck 200 includes an operator cab 210, a mast 270, a truck frame 280, and multiple steps 290 to provide an operator access to the cab 210. FIGS. 2A and 2B show the mast 270 having a mast column 272, fork carriage 274, and a fork 276. Any type of mast may be used in the lift trucks disclosed herein. Additional components of the lift truck 200 include a front windshield 277, an overhead guard 278, a front wheel 283, a rear wheel 285, and an extended bottom step 295 on truck frame 280.

FIG. 2A shows the exterior side of the left cab door 200, and FIG. 2B shows the interior side of the left cab door 220. The door 220 opens and closes by rotation about the substantially vertical axis A shown in FIGS. 2A and 2B. FIGS. 2A and 2B further depict a pin 256 and a knob 255 on the bottom of door 220, respectively. The knob 255 as used herein refers to a protrusion and is not to be confused with a door knob. The bracket 251 (described below in reference to FIG. 5) is not shown in FIG. 2A for clarity.

The door 200 includes at least one glass sheet 230, a horizontal door supporting member 240, and an operable window 260. As used herein, the term "operable window" refers to a window that can be opened and closed and is in contrast to a fixed sheet of glass or other transparent material that does not open.

Figure 1B:
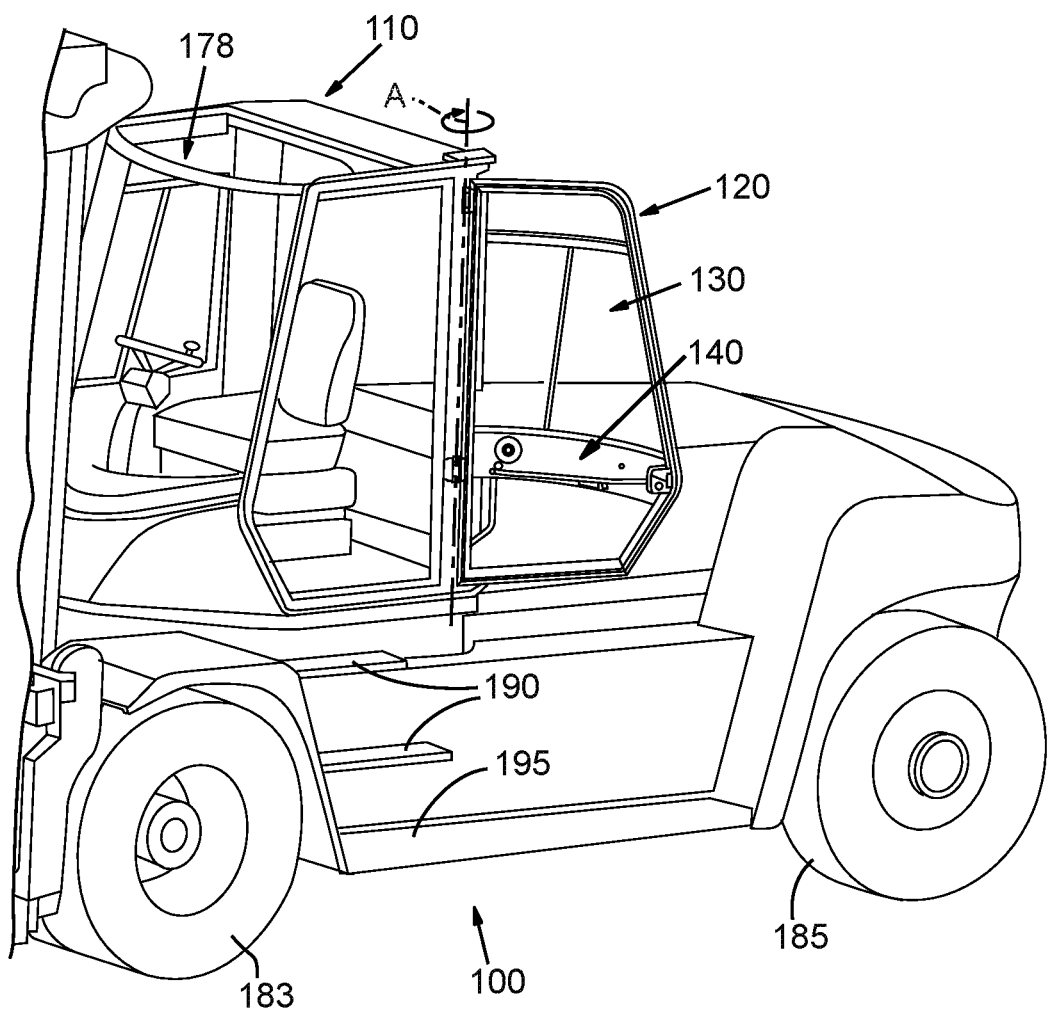
FIG. 1B is an isometric drawing of the conventional lift truck of FIG. 1A, with the left cab door open, and with the mast removed for clarity.

Comparing certain aspects of the conventional lift truck 100 in FIGS. 1A and 1B to the lift trucks disclosed herein, of which lift truck 200 shown in FIGS. 2A and 2B is an embodiment, differences in the design of the horizontal support members 140 and 240 are evident. In the conventional lift truck 100, the vertical height of the support member 140 is much larger than that of the support member 240 in the lift truck 200. The larger vertical height in conventional lift truck 100 obstructs the operator's view through the door 120 more than that of the door 220, which has a narrower support member 240. In addition, the pin 256 and the knob 255 are not present in conventional lift truck 100.

Figure 3:
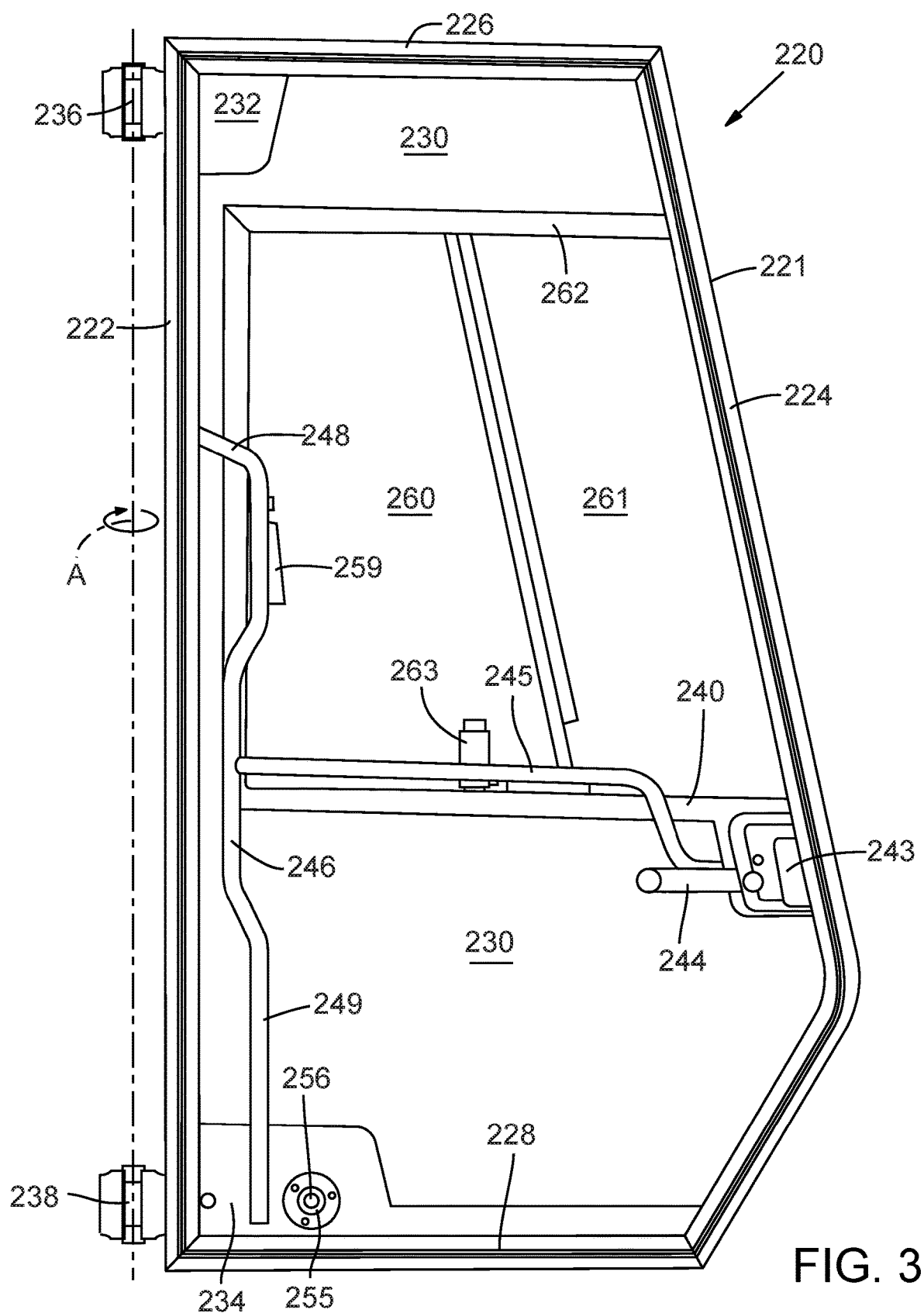
FIG. 3 illustrates an embodiment of a cab door that can be used for lift trucks, including the truck of FIG. 2.
Figure 4:
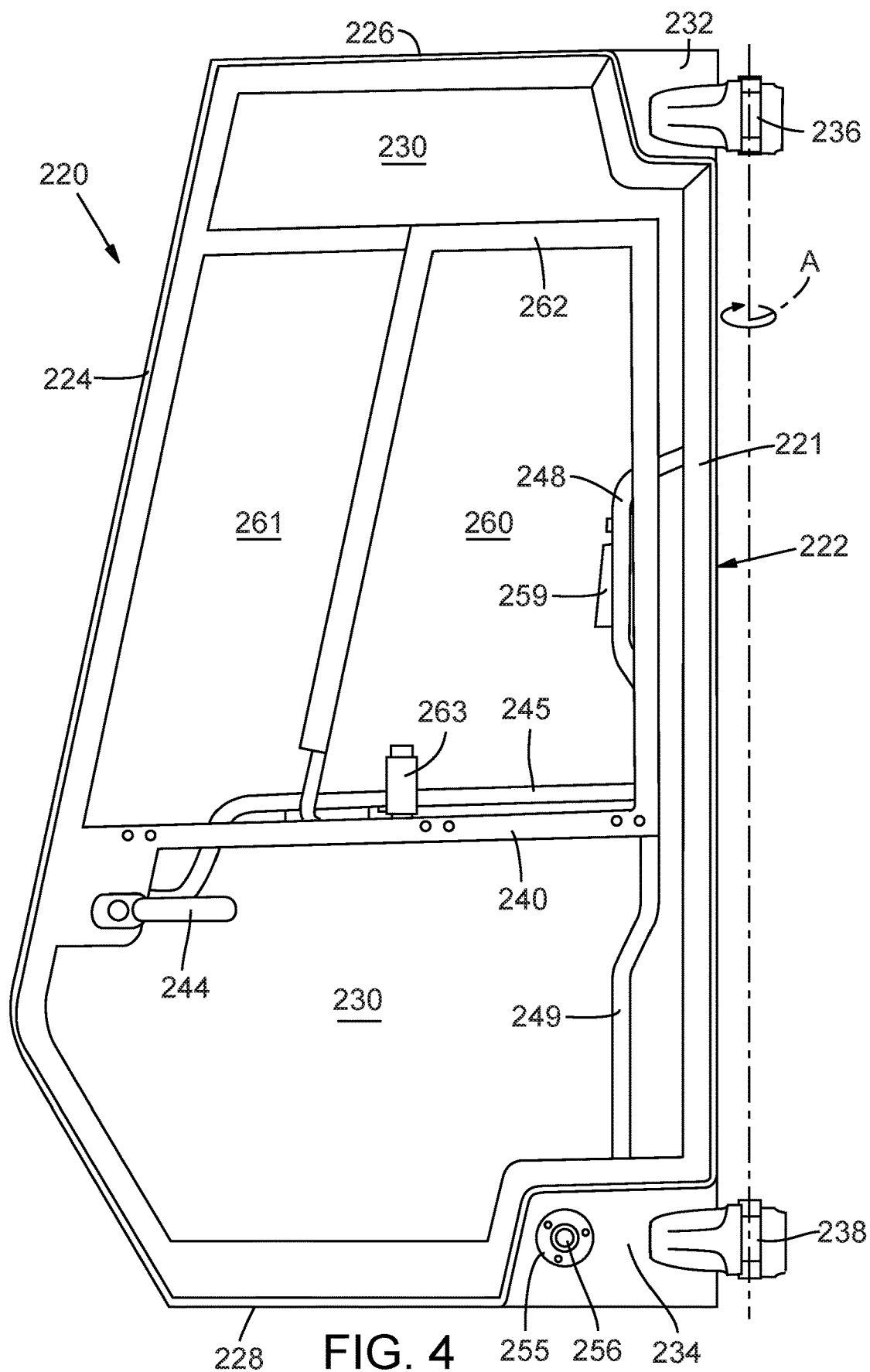
FIG. 4 is a drawing of the exterior side of the cab door of FIG. 3 such as viewed from outside the cab when the door is closed, according to one embodiment.
Figure 5:
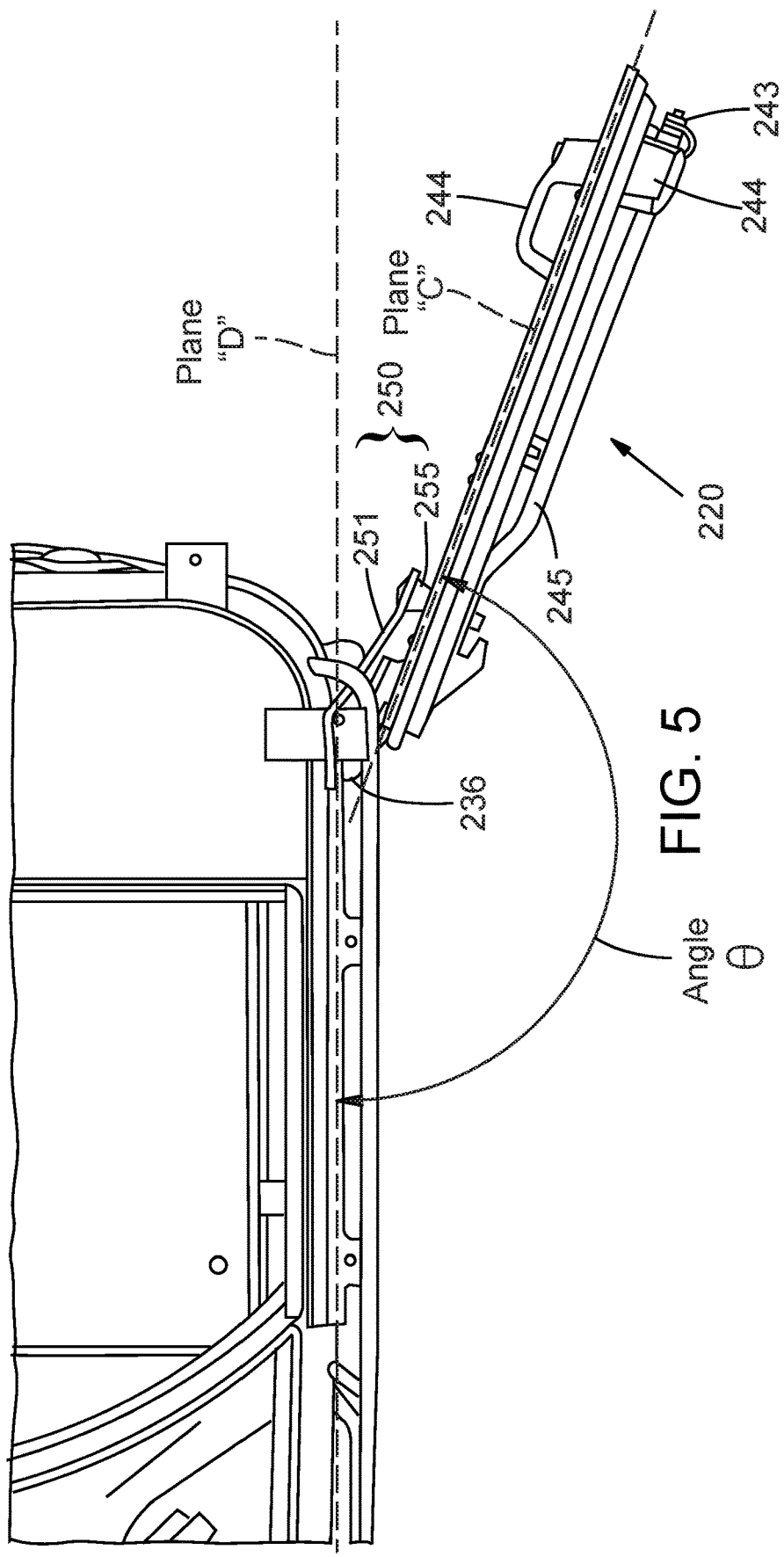
FIG. 5 is a top view of a section of the lift truck of FIG. 2B.

FIGS. 3, 4 and 5 illustrate an exemplary cab door 220 for the lift truck 200. FIG. 3 shows the interior side of a left cab door 220 such as is viewed by the operator from inside the cab when the door 220 is closed. FIG. 4 shows the exterior side of the left cab door 220 such as is viewed from outside the cab when the door 220 is closed. FIG. 5 is a top view of a section of the lift truck 200, showing the door 220 fixed in an open position by a catch assembly 250.

The door 220 includes a door frame 221 which extends around the circumference of the door 220 and that encompass one or more glass sheets 230. The door frame 221 may be made of any suitable strong and/or lightweight material, such as metal or plastic. In an embodiment, the door frame 221 is made of steel. In an embodiment, the door frame 221 comprises steel.

The door frame 221 has a substantially vertical peripheral edge 222 that is on the side of the door 220 that attaches to the cab, a peripheral edge 224 that is opposite the attachment edge 222 and that is on the side of the door 220 that swings open and closed to provide operator access to the cab, a substantially horizontal upper peripheral edge 226, and a substantially horizontal lower peripheral edge 228.

In an embodiment, the door frame 221 is approximately rectangular in shape, with a substantially vertical peripheral edge 222 and a peripheral edge 224 that is also substantially vertical, the edges 222 and 224 having approximately equal lengths, and substantially horizontal peripheral edges 226 and 228 having approximately equal lengths that are shorter than, and substantially perpendicular to, the peripheral edges 222 and 224. In an embodiment, the door frame 221 has substantially horizontal peripheral edges 226 and 228 having approximately equal lengths, which are substantially perpendicular to, and shorter than, the substantially vertical peripheral edge 222, with the peripheral edge 224 having a bowed or bent shape, such as the door frame 221 shown in FIGS. 3 and 4.

The door frame 221 includes, adjacent to the upper peripheral edge 226, an upper hinge connection area 232 and, adjacent to the lower peripheral edge 228, a lower hinge connection area 234. The upper hinge connection area 232 and lower hinge connection area 234 are both in proximity to the substantially vertical peripheral edge 222 on the attachment side of the door 220. The upper hinge 236 and the lower hinge 238 are connected to the upper hinge connection area 232 and the lower hinge connection area 234, respectively, and each hinge 236, 238 is also connected to the operator cab 210 to thereby attach the door 220 to the truck 200. The hinges 236, 238 connect such that the door frame 221 can rotate about the substantially vertical axis "A" that is adjacent to and parallel with the substantially vertical peripheral edge 222, to open and close the door 220. In an embodiment, the door 220 includes a third hinge that is also located on the edge 222, positioned between the upper hinge 236 and lower hinge 238.

The door 220 includes at least one glass sheet 230 that forms the majority of the surface area of the door 220, and that is encompassed within and attached to the door frame 221. In an embodiment, the door 220 includes a set of glass sheets 230. A set of glass sheets may include any number of individual glass sheets 230, such as 2, 3 4, 5 or 6 sheets. The glass sheet 230 may be made with tempered glass or with plexiglass, and may, in an embodiment, be tinted. In an embodiment, the glass sheet 230 is tempered glass. The thickness of the glass sheet 230 in the door 220, in some embodiments, ranges between about 3 and about 10 millimeters, such as between about 4 and about 6 millimeters, or can be about 5 millimeters thick. The thickness of the glass in the overhead guard 278, in some embodiments, may be thicker than that of the glass in the door 220 and/or the overhead guard 278 be made with multiple overlapped glass sheets 230. The thickness of the glass portion of the overhead guard 278 can range between about 15 and about 35 millimeters, such as between about 20 and about 25 millimeters, or can be about 22 millimeters thick.

The door 220 also includes a substantially horizontal support member 240 that connects to the peripheral edge 224 on the swinging-open side of the door 220 and extends horizontally toward the substantially vertical peripheral edge 222 on the attachment side of the door 220. The support member 240 is sized and positioned to minimize visual obstruction to an operator seated in the operator cab looking through the door. On the peripheral edge 224, the support member 240 is connected to the door frame 221 as well as to the door latch assembly 243 and a handle 244. The handle 244 extends through the door 220 to the exterior side of the door 220 and is connected to the door 220 in proximity to the peripheral edge 224 that is opposite the attachment edge 222 on the swinging-open side of the door. In proximity to the attachment peripheral edge 222 side of the door 220, the substantially horizontal support member 240 connects to a vertical section of window frame 262 but does not completely extend across to (that is, to intersect approximately perpendicularly with) the door frame 221 on the substantially vertical peripheral edge 222. Instead, support member 240 terminates at the window frame 262, increasing the unobstructed surface area of the door 220.

The door 220 further includes a horizontal operator handlebar 245 connected to the door frame 221 that provides structural strength to the door frame 221. The horizontal operator handlebar 245 is positioned in proximity to the horizontal support member 240 in a manner that does not appreciably visually obscure sight through the door 220 any more than the support member 240 obscures operator visibility. In this manner, operator visibility through the door 220 is maximized.

The door 220 also includes a vertical operator handlebar 246 having an upper extended portion 248 and a lower extended portion 249. The upper extended portion 248 of the vertical operator handlebar 246 is connected to the door frame 221 on the substantially vertical peripheral edge 222 between the upper hinge 236 and the horizontal support member 240. The lower extended portion 249 of the vertical operator handlebar 246 is connected to the door frame 221 at the lower hinge connection area 234 in proximity to the substantially horizontal lower peripheral edge 228. The upper extended portion 248 and the lower extended portion 249 of the vertical operator handlebar 246 protrude slightly outwardly from the main plane of the door 220 (that is, toward the interior of the operator cab when the door 220 is closed) to allow for ergonometric use of the handlebar 246 by an operator while entering or exiting the cab 210 or during operation of the lift truck 200. The vertical operator handlebar 246 provides structural strength to the door frame 221 and is positioned in proximity to the substantially vertical peripheral edge 222 on the attachment side of the door 220 so as not to not unduly visually obscure sight through the door.

The horizontal operator handlebar 245 connects to the vertical operator handlebar 246 in proximity of the substantially vertical peripheral edge 222 at an approximately right angle, to aid in maximizing the strength of door frame 221 of the door 220. The size and position of handlebars 245, 246 are such that visual obstruction by an operator seated in the cab and looking through the door is minimal.

The lift truck 200 can, in some embodiments, additionally incorporate a catch assembly 250. The catch assembly 250 includes a bracket 251 that is connected to the exterior of cab 210, and a knob 255 that is connected to the door 220. The knob 255 is positioned in the lower section of the door 220 in proximity to the lower peripheral edge 228 and the lower hinge connection area 234. In an embodiment, the knob 255 is positioned within the lower third of the area of the door 220. In an embodiment, the knob 255 is positioned within the lower quarter of the area of the door 220. The knob 255 protrudes slightly outwardly from the main plane of the door 220 on both the interior and the exterior sides of the door 220. The knob 255 on the exterior side of door 220 is configured to engage with the bracket 251 (as shown in FIGS. 5 and 6B), to thereby hold the door 220 open. When the knob 255 is disengaged from the bracket 251, the door 220 may be closed. The vertical operator handlebar 246 includes a catch release lever 259 that is coupled to the knob 255 to disengage the knob 255 from the bracket 251 when the release lever 259 is depressed.

Figure 6A:
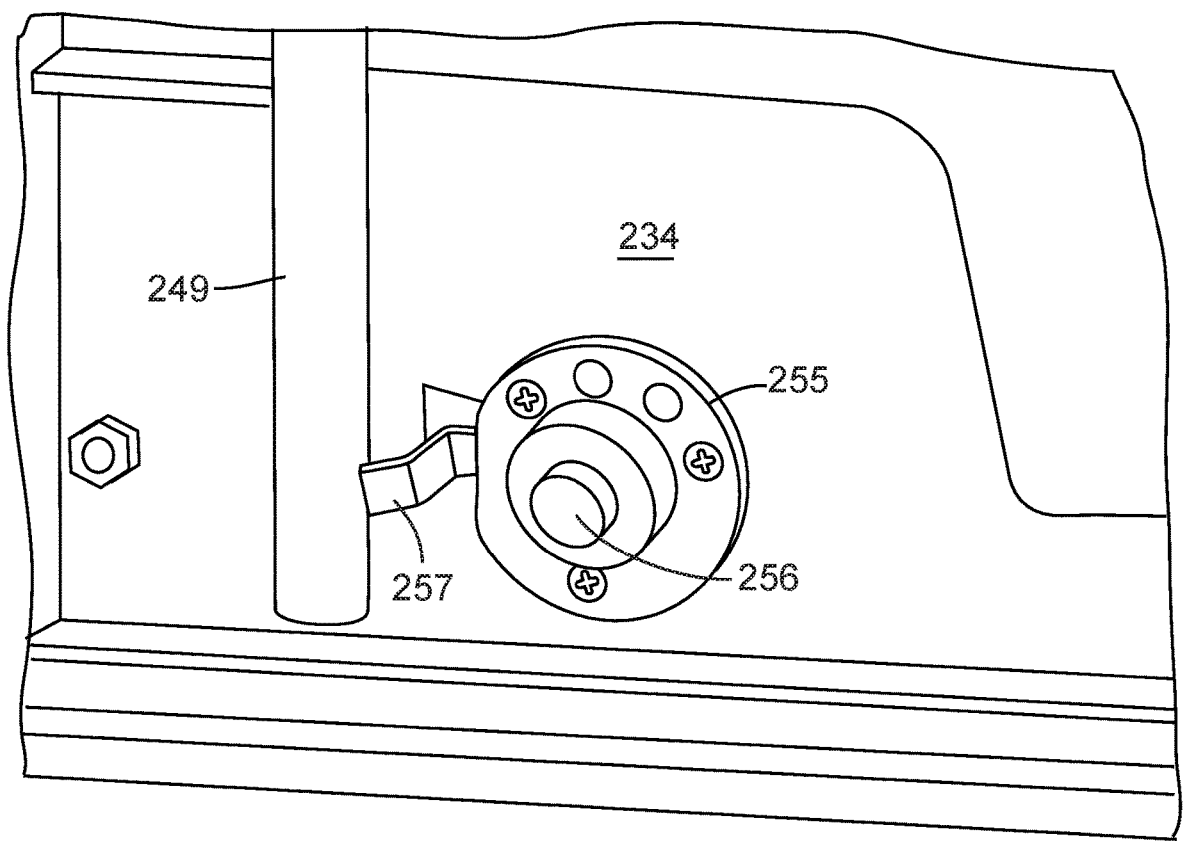
FIG. 6A is a close-up view of the lower left portion of FIG. 3, enlarged to show greater detail, according to one embodiment.
Figure 6B:
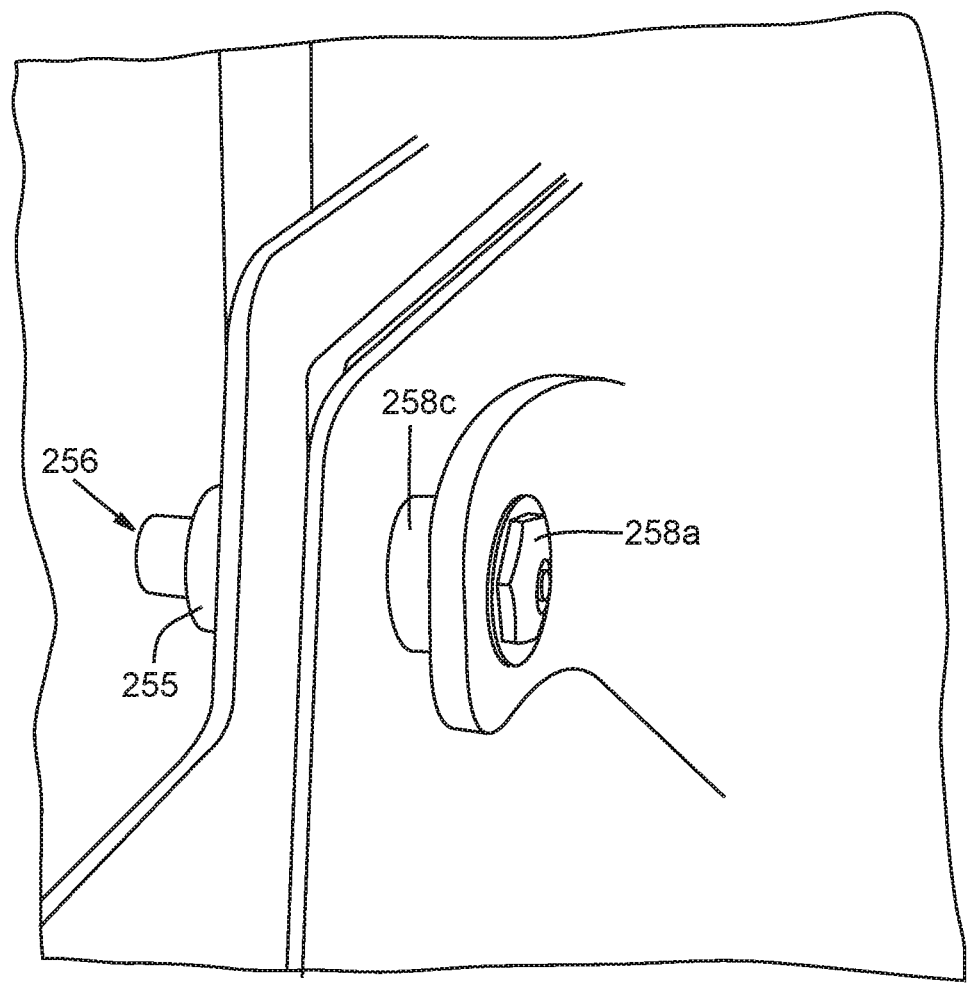
FIG. 6B is a close-up view of the lower section of the hinged side of the door of FIG. 4 when the door is open, enlarged to show greater detail, according to one embodiment.
Figure 6C:
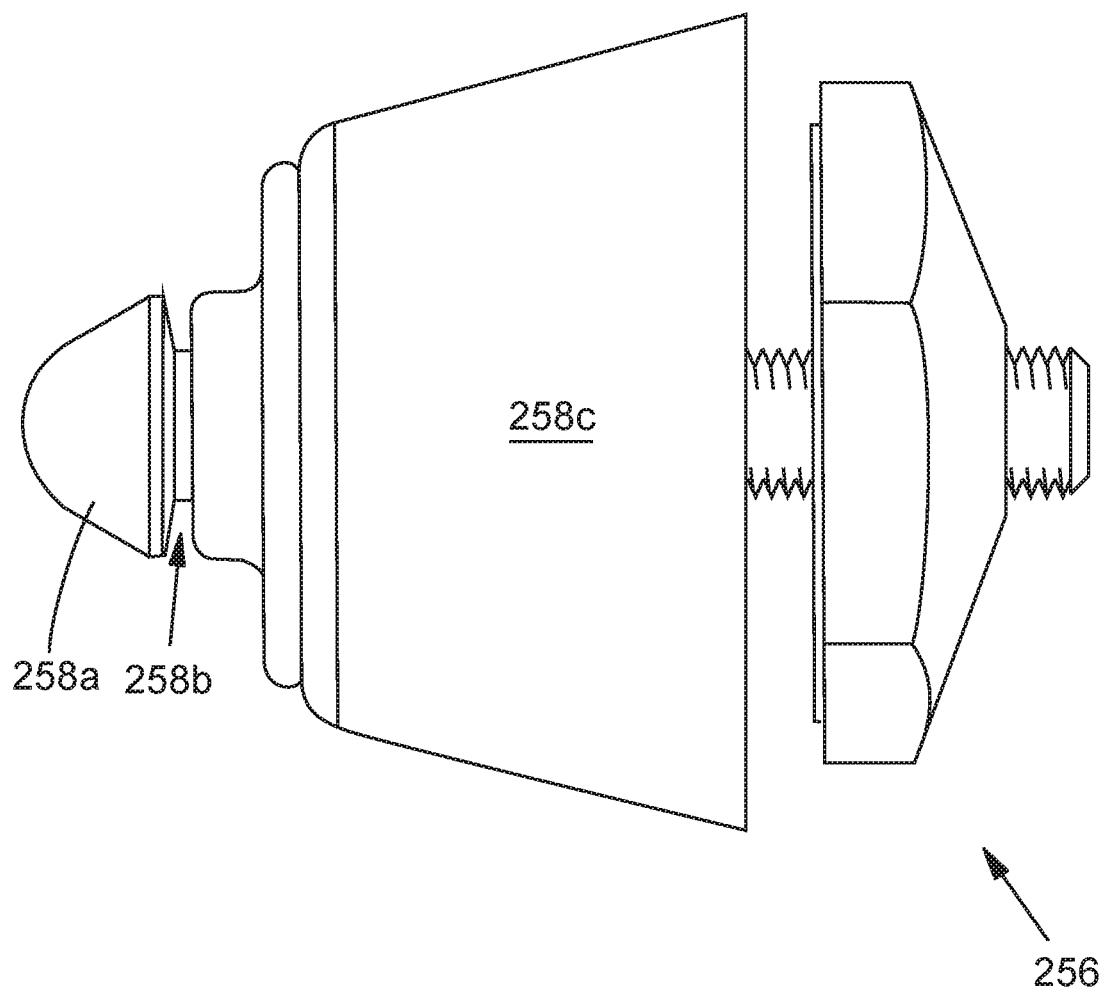
FIG. 6C is a side view of an illustration of a portion of a catch assembly, enlarged to show greater detail, according to one embodiment.

FIGS. 6A, 6B, and 6C are expanded illustrations showing an embodiment of the catch assembly 250 in additional detail. The knob 255 includes a central pin 256, having its major axis spanning across the thickness of the door 220 and perpendicular to the major plane of the door 220. With reference to FIGS. 6A and 6C, the central pin 256 is substantially centered coaxially in the knob 255 and includes a compressible wide head portion 258a with a flat end, a thin neck portion 258b proximal to the flat end of head portion 258a, and a stopper portion 258c. The compressible wide head portion 258a fits through a hole in the bracket 251 until the flat end is pushed past a collar (not shown) in the bracket 251, where the thinner neck portion 258b rests inside the collar and the larger width of the head portion 258a maintains the pin 256 within the bracket 251 via expansion and/or closure of the collar. The stopper portion 258c of the pin 256 can additionally or alternatively compress and/or help maintain the head portion 258a in the collar. Thus, when the head portion 258a of the central pin 256 is pushed past the collar and the neck portion 258b is encircled by the collar, the knob 255 is engaged with the bracket 251 to hold the door 220 open. When the head portion 258a of central pin 256 is released from the collar, the pin 256 disengages from the bracket 251 to permit the door 220 to close.

The vertical operator handlebar 246 includes a catch release lever 259 that is coupled to the bracket 251 in a manner that releases the head portion 258a of the pin 256 from the collar (thereby separating the pin 256 from the bracket 251) when the release lever 259 is depressed. The head portion 258a of the pin 256 may also be released from the collar by depression of the manual release bar 257 (shown in FIG. 6A), to permit the door 220 to close. In an embodiment, the head portion 258a of the pin 256 is made of rubber. In an embodiment, the catch release lever 259 is a spring-loaded lever that is connected to the bracket 251 via a wire.

The catch assembly 250 is able to maintain the door 220 in its fully open position, with the knob 255 secured in the bracket 251, until the knob 255 is released by the operator via either the manual release bar 257 or catch release lever 259. Referring to FIG. 5, the door opening within the frame of the cab 210 can be considered to lie in a substantially flat plane (labeled as plane D in FIG. 5), which includes the vertical axis A about which the door hinges 236, 238 rotate. Similarly, the door 220 can be considered to have a substantially major plane (labeled as plane C in FIG. 5), which is substantially coplanar with plane D when the door 220 is closed. When the catch assembly 250 is engaged, that is, when the knob 255 is secured in the bracket 251, the angle between planes C and D (shown as angle theta in FIG. 5), also referred to as the "opening angle" of the door 220, can range between about 140 degrees and about 170 degrees. In an embodiment, the opening angle of the door 220 when the catch assembly 250 is engaged is between about 155 degrees and about 165 degrees. In an embodiment, the opening angle of the door 220 when the catch assembly 250 is engaged is about 158 degrees.

The catch assembly 250 may also be used to hold the door 220 open in various other opening angles. For example, when the catch assembly 250 is engaged, the opening angle of the door 220, can range between about 40 degrees and about 70 degrees. In an embodiment, the opening angle of the door 220 when the catch assembly 250 is engaged is about 45 degrees. In an embodiment, the opening angle of the door 220 when the catch assembly 250 is engaged is about 60 degrees.

The catch assembly 250 may be arranged in various configurations while maintaining its ability to rigidly hold the door 220 open. For example, the bracket 251 and knob 255 may be arranged in a lift truck in an opposite arrangement than is shown in FIGS. 2-6, that is, in a configuration where the bracket 251 is mounted on the outer side of door 220 and the knob 255 is mounted on the cab frame 280. In an embodiment, the knob 255 and the bracket 251 are positioned in the upper portion of the door 220 in proximity to upper hinge connection area 236.

The placement and design of the substantially horizontal support member 240, the horizontal operator handlebar 245, and the vertical operator handlebar 246, when attached to the door frame 221, can contribute to the door 220 successfully absorbing an impact by transferring the energy of the impact away from the glass sheet 230 and instead toward the truck frame 180. In this manner, a door 220 that may be slightly ajar and that is caught by a gust of wind and thus blown forcefully open, will maintain its integrity and not break (that is, the glass 230 within the door 220 will not shatter and the door frame 221 will not substantially deform).

A test was designed to simulate an environment in which a lift truck was exposed to strong crosswinds. A lift truck substantially identical to the lift truck shown in FIGS. 2-7, 10 and 11, was placed on a flat bed trailer behind a towing vehicle, with the front of the lift truck, as viewed by an operator sitting in the cab and looking straight toward the mast, facing the front of the trailer and viewing the rear of the towing vehicle. The plane of the door opening was approximately coplanar with the direction of forward motion of the towing vehicle, and the towing vehicle was then driven in an approximately straight line. The left cab door on the lift truck was closed while the towing vehicle and trailer got up to speed, and was then opened when the towing vehicle reached 82 kilometers per hour, or kph. At this speed, due to the high wind speed the door slammed open and engaged with the catch assembly to secure the door in an open position. After the towing vehicle and trailer were stopped, the left cab door was inspected for damage and deformation. No substantive damage or deformation to the door frame, glass sheets, catch assembly, or the rest of the door was observed.

The catch assembly 250 rigidly secures the door 220 in the bracket 251 and is therefore able to withstand high winds without substantive damage to the door 220 and/or other parts of lift truck 200 when the door is open. In an embodiment, the door frame 221 does not substantially deform when the door 220 is open and the knob 255 is engaged with the bracket 251, upon exposure to wind having a speed of about 80 kph that is blowing in a direction that is substantially parallel to the door opening of the operator compartment 210. In an embodiment, the wind has a speed of about 82 kph.

Figure 7:
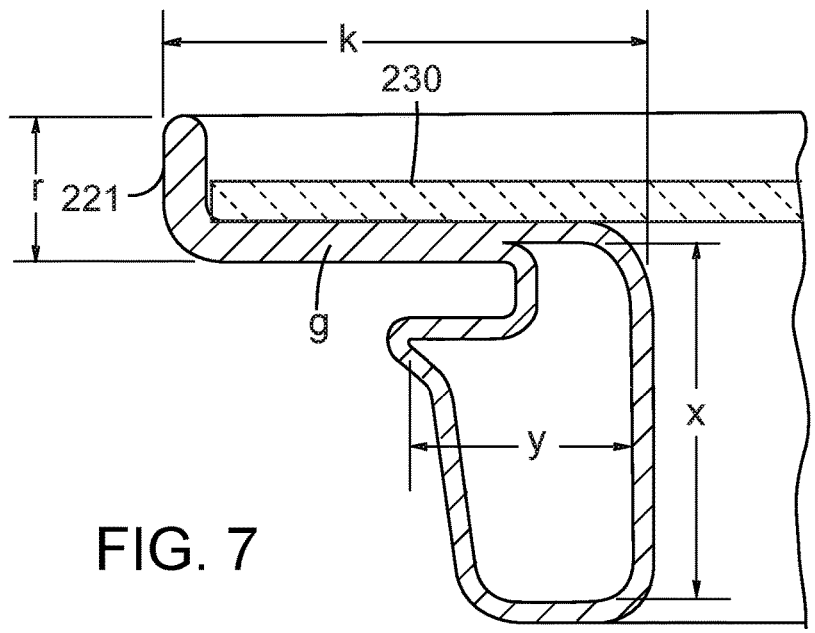
FIG. 7 is a cross-sectional illustration of a frame of a cab door, according to one embodiment.

FIG. 7 shows a cross-sectional view of the door frame 221 and a glass sheet 230. The door frame 221 has a main core that is hollow and generally rectangular in shape when viewed in cross-section. The hollow core has a height x and a width y. A groove extends from an edge of the hollow rectangular core and terminates in a retaining lip r, which surrounds an edge of a glass sheet 230 and to which the glass sheet 230 is adhered. The glass sheet 230 may be adhered to the door frame 221 by any appropriate adhesive known in the art. For example, the adhesive may be a 2K MS polymer 225 black sealing compound.

The thickness of the material used to form the door frame 221 is between about 1 and 5 millimeters. In an embodiment, the thickness of the material used to form the door frame 221 is between about 1.5 and 2.5 millimeters. The height x of the hollow rectangular core is between about 30 and 40 millimeters, such as about 34 millimeters, and the width y ranges between about 5 and 25 millimeters. In an embodiment, the widest width y of the hollow rectangular core is about 21 millimeters, and the shortest width y is about 8 millimeters. The length of retaining lip r is between about 5 and about 15 millimeters, such as about 10 millimeters. The combined length of groove g, the thickness of retaining lip r, the width y, and the outer wall of the hollow core, as shown as distance k in FIG. 7, is between about 35 and 65 millimeters, such as between about 40 and 50 millimeters, or about 46 millimeters. The thickness of the glass sheet 230 adhered to door frame 221 is between about 3 and about 10 millimeters, such as about 5 millimeters.

In an embodiment, the door frame 221 includes a hollow core that is generally rectangular in shape when the frame 221 is viewed in cross-section, the hollow core having a height that is between about 32 and 36 millimeters and a width that is between about 8 and about 21 millimeters, and further including a groove that extends from an edge of the hollow core that terminates in a retaining lip, the retaining lip having a length between about 5 and 15 millimeters. In an embodiment, the ratio of the thickness of the door frame 221 to the thickness of the glass is between 1:1 and 1:10, such as between 1:1 and 1:5, or 1:2.5.

The door 220 can be manufactured in a series of steps, as understood by those skilled in the relevant art. In an embodiment, a piece of flat steel sheet is shaped into the profile of the door frame 221, then cut and bent to the desired size and shape of the door perimeter. Then, support members, hinge attachment areas, handlebars, and other elements such as, for example, profiles, can be combined by welding them to the frame 221 in a fixture. The door 220 can then be cleaned and protected against corrosion. The glass sheets and sliding glass can be adhered to the door frame 221 to form the door 220.

The door 220 may include an operable window 260. As depicted in FIGS. 3 and 4, the window 260 is made from a moveable glass pane or sheet that slides along the top of the horizontal support member 240 adjacent to, and overlapping, a fixed glass sheet 261 to thereby open the window in a substantially horizontal direction. The window 260 is encompassed along its circumference by a window frame 262. The window 260 may be positioned vertically between the upper hinge 236 and the horizontal support member 240 of the door 220 and opens in a direction that is substantially parallel with the upper peripheral edge 226 of the door 220. In an embodiment, the window 260 is positioned vertically between the upper hinge 236 and the lower hinge 238 of the door 220 and opens in a direction that is substantially parallel with the upper peripheral edge 226 of the door 220.

In some embodiments, the window 260 includes a window actuator 263 having a button or lever that must be compressed to allow the window to slide along the support member 240. The window actuator 263 is shaped and located such that it can be easily and comfortably grasped by the operator while seated in the cab, to open and close the window 260. In an embodiment, the window actuator 263 is positioned at the lower edge of the window 260 and above the horizontal support member 240.

Figure 8:
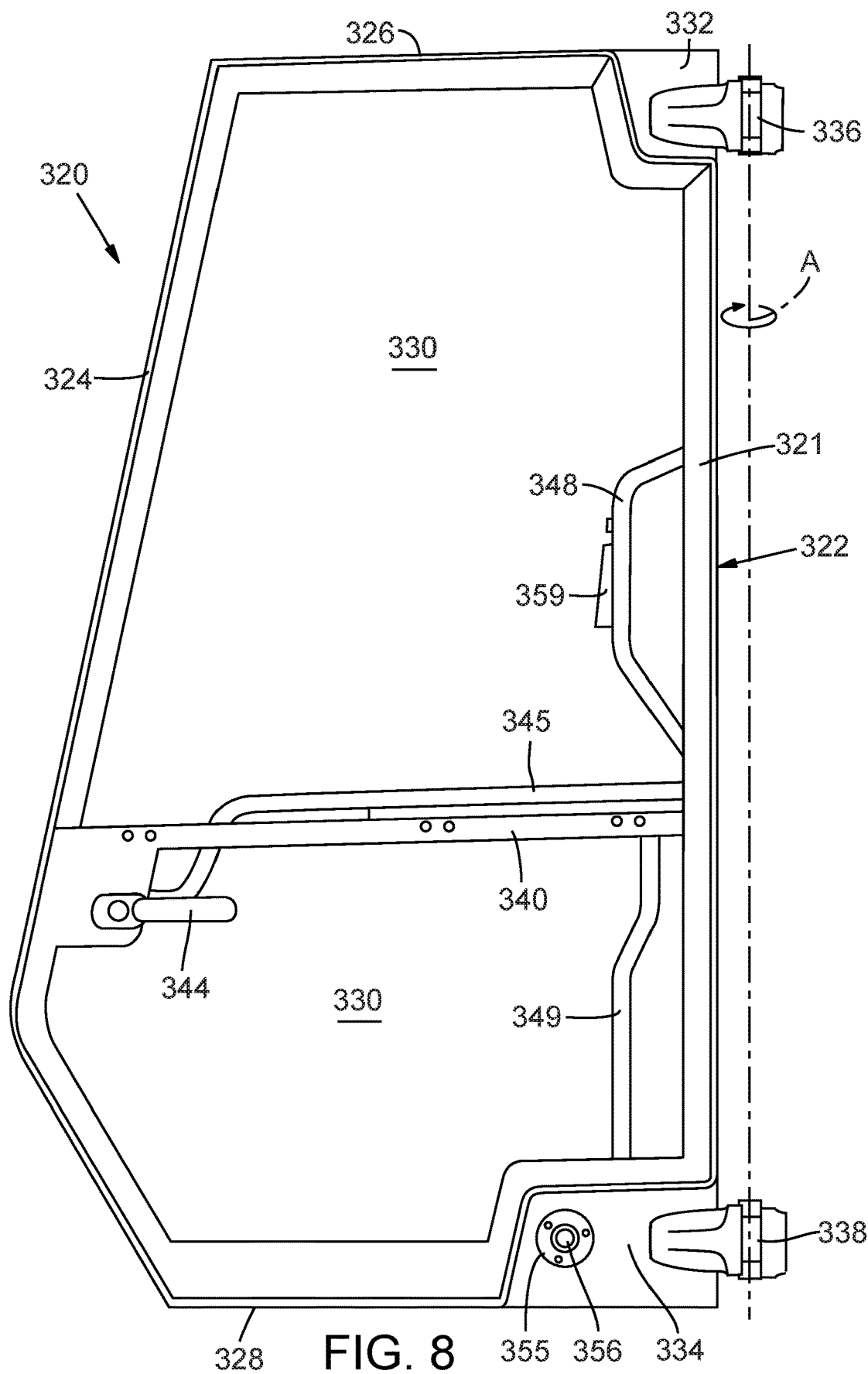
FIG. 8 illustrates an alternative embodiment of a cab door that can be used for lift trucks, including the truck of FIG. 2.

FIG. 8 illustrates an exterior view of a door 320 that does not include an operable window. In the door 320, a fixed glass sheet 330 comprises the majority of the planar surface area of the door 320, providing an operator with high visibility through the door. In an embodiment, the door 320 may include one or more glass sheets 330. In an embodiment, the door 320 does not include a window. The door 320 may include door frame 321 having substantially vertical peripheral edge 322 that is on the side of the door 320 that attaches to the cab, a peripheral edge 324 that is opposite the attachment edge 322 and that is on the side of the door 320 that swings open and closed to provide operator access to the cab, a substantially horizontal upper peripheral edge 326, and a substantially horizontal lower peripheral edge 328.

The door 321 can further include, adjacent to the upper peripheral edge 326, an upper hinge connection area 332 and, adjacent to the lower peripheral edge 328, a lower hinge connection area 334, with a upper hinge 336 and the lower hinge 338 connected to the upper hinge connection area 332 and the lower hinge connection area 334, respectively. The hinges 336, 338 connect such that the door frame 321 can rotate about the substantially vertical axis "A" that is adjacent to and parallel with the substantially vertical peripheral edge 322, to open and close the door 320.

The door 321 may, in some embodiments, include a substantially horizontal support member 340 that is sized and positioned in a manner similar that described for support member 240 for the door 221, e.g., to minimize visual obstruction to an operator seated in the operator cab looking through the door. On the peripheral edge 324, the support member 340 is connected to the door frame 321 as well as to the door latch assembly 343 and a handle 344. In proximity to the attachment peripheral edge 322 side of the door 320, the substantially horizontal support member 340 completely extends across to (that is, to intersect approximately perpendicularly with) the door frame 321 on the substantially vertical peripheral edge 322. The door 320 further includes a horizontal operator handlebar 345 connected to the door frame 321 that provides structural strength to the door frame 321, which is positioned in proximity to the horizontal support member 340 in a manner that does not appreciably visually obscure sight through the door 320 any more than the support member 340 obscures operator visibility. In this manner, operator visibility through the door 320 is maximized.

The door 320 can also include a vertical operator handlebar 346 having an upper extended portion 348 and a lower extended portion 349. The upper extended portion 348 of the vertical operator handlebar 346 is connected to the door frame 321 on the substantially vertical peripheral edge 322 between the upper hinge 336 and the horizontal support member 340. The lower extended portion 349 of the vertical operator handlebar 346 is connected to the door frame 321 at the lower hinge connection area 334 in proximity to the substantially horizontal lower peripheral edge 328. A horizontal operator handlebar 345 connects to the vertical operator handlebar 346 in proximity of the substantially vertical peripheral edge 322 at an approximately right angle, to aid in maximizing the strength of door frame 321 of the door 320. As described for the door 220, the size and position of handlebars 345, 346 are such that visual obstruction by an operator seated in the cab and looking through the door is minimal. The door 320 can additionally incorporate a catch assembly 250 including a knob 355 and a pin 356, as described for the door 220, with the knob 355 on the exterior side of door 320 being configured to engage with a bracket 351 (not shown in FIG. 8), to thereby hold the door 320 open. The vertical operator handlebar 346 includes a catch release lever 359 that is coupled to the knob 355 to permit the knob 355 to separate from the bracket 351 when the release lever 359 is depressed, to thereby permit the door 320 to close.

Figure 9A:
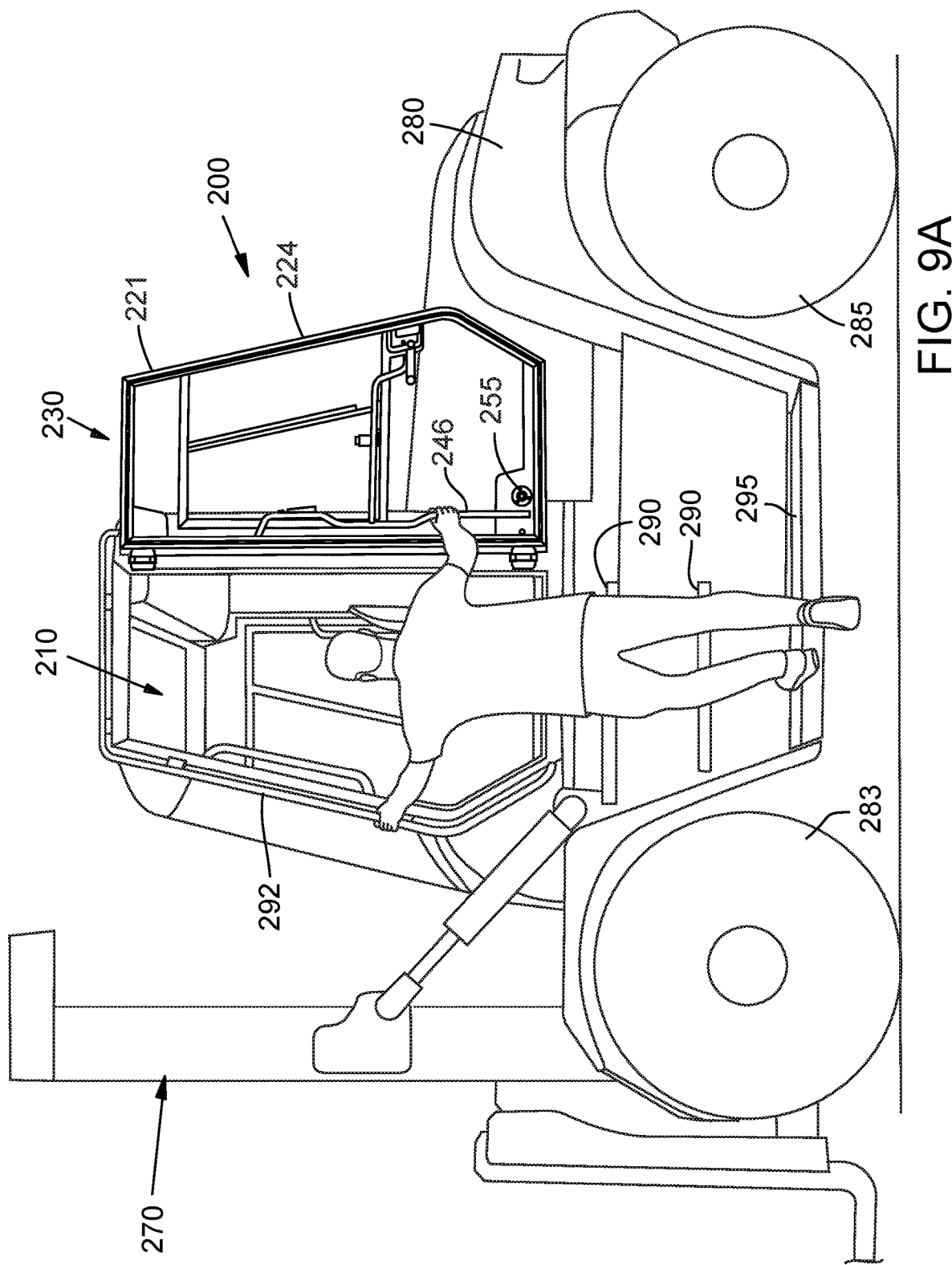
FIGS. 9A and 9B represent consecutive sequential illustrations of an operator entering a cab, according to an embodiment of the lift truck of FIG. 2, from a left perspective.
Figure 9B:
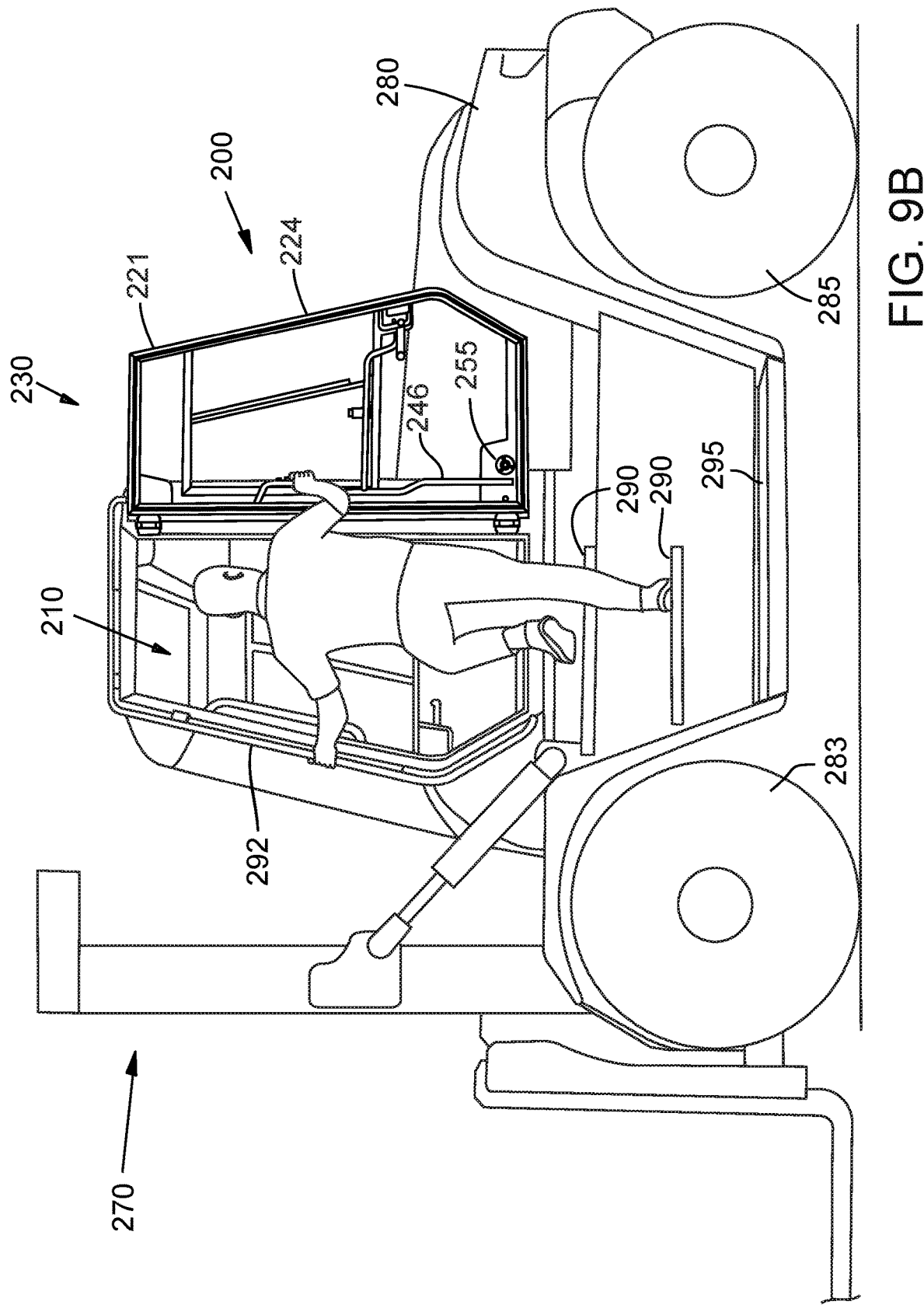

FIGS. 9A and 9B depict sequential illustrations of an operator entering the cab 210 of a lift truck 200. The cab 210 includes an external vertical handlebar 292 located on the exterior of the cab 210 and in the proximity of the peripheral edge 224 that is opposite the attachment edge 222 and on the swinging-open side of the door 220, when the door is closed. The truck 200 has at least one step 290 (as shown in FIG. 2A) that is positioned on the truck frame 280 below the floor of cab 210 and laterally between the mast 270 and rear wheel 285. The truck 200 may incorporate a laterally extended step 295 as an embodiment of a step 290, which can extend along the lower portion of the frame 280.

As shown in FIGS. 9A and 9B, an operator can enter or exit the cab 210 of the truck 200 using an ergonometric three-point access system, the three points being (1) a step 290 (including, for example, an extended step 295), (2) the external vertical handlebar 292, and (3) the substantially vertical handlebar 246 of the door 220, which is readily accessible when the door 220 is in the open position. The design, size and placement of the handlebars 246 and 292 will permit operators of varying heights or having various ranges of limb motions (such as a limited shoulder rotation) to comfortably enter and exit the cab 210.

During operator ingress or egress, the catch assembly 250 may optionally be engaged (that is, the knob 255 is fixedly engaged with bracket 251) to rigidly hold the door open. In an embodiment, the truck 200 includes a door frame 221 having a substantially vertical handlebar 246, a plurality of steps 290, and an external vertical handlebar 292 that is configured to permit an operator to ergonomically enter and exit the cab 210.

Figure 10:
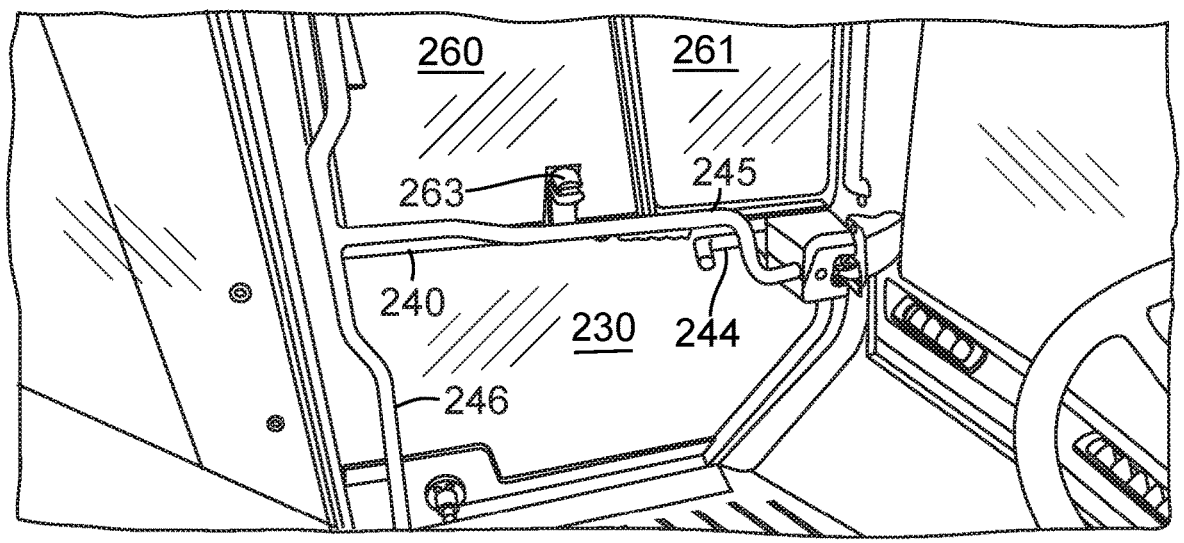
FIG. 10 is an illustration depicting the operator's view from inside the cab and through a closed left-side cab door, according to an embodiment of the lift truck of FIG. 2.

FIG. 10 is an illustration depicting the operator's view from inside the cab, according to an embodiment of the lift truck of FIG. 2. The strategic size and placement of certain components of the door 220, including the door frame 221, at least one glass sheet 230, the horizontal support member 240, the door handle 244, the horizontal operator handlebar 245, the vertical operator handlebar 246, the knob 255, the window 260 with pane 261, and window actuator 263, result in the door 220 having relatively little obstruction over its total planar surface area.

As described herein, the amount of obstruction or visual obstruction of a door refers to the amount of the total planar surface area of the door that is not optically transparent as viewed by an operator seated in the cab and operating the truck. Although in some embodiments the door 220 may be slightly curved in a convex manner (with respect to an operator in the cab), the major plane of the door 220 is essentially coplanar with the plane C shown in FIG. 5. The total planar surface area of the door refers the surface area of the interior of the door as if the door were substantially planar. The amount of visual obstruction refers to the percentage of the total planar surface area that an operator, when seated in the cab and operating the truck, cannot see through. In some embodiments, the amount of visual obstruction of the door is less than or equal to 5%, 10%, 15%, 20%, 25%, or 30% of the total planar surface area of the door. In some embodiments, the amount of visual obstruction of the door is no more than about 5%, 10%, 15%, 20%, 25%, or 30% of the total planar surface area of the door.

In an embodiment, the view from the operator compartment through the interior side of the door when the door is in a closed position, is unobstructed over about 95%, 90%, 85%, 80%, 75%, 70%, 65% or 60% of the total planar surface area of the door 220. In an embodiment, the view from the operator compartment through the interior side of the door when the door is in a closed position, is unobstructed over about 75% of the total planar surface area of the door 220. In one embodiment, the view from the operator compartment through the interior side of the door when the door is in a closed position, is unobstructed over about 85% of the total planar surface area of the door 220.

The lift truck doors 220 and 320, including those depicted in FIGS. 2-11, are exemplary embodiments of the lift trucks disclosed herein. It is understood that various features of the doors 220 and 320 are optional and may be omitted from a lift truck while maintaining one or more of the advantageous features of the disclosed lift trucks. For example, an operable window is optional, as depicted in the embodiment of the door 320 shown in FIG. 8. In addition, the operable window may be made with more than one slidable glass portion. In an aspect, only the door 220 in FIGS. 2A and 2B is claimed, but the other components are shown for context and setting and only for illustrative purposes. In a further aspect, only the operator cab 210 in FIGS. 2A and 2B is claimed, and the other components are shown for context and setting and only for illustrative purposes. In one aspect, the entire lift truck 200 in FIGS. 2A and 2B is claimed.

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A door for an operator cab of a lift truck, wherein the operator cab comprises a cab frame, and wherein the door comprises:
   a door frame defining periphery edges of the door, the door frame comprising:
      a substantially vertical peripheral attachment edge on an attachment side of the door;
      a peripheral edge opposite the attachment edge and on a swinging-open side of the door;
      a substantially horizontal upper peripheral edge; and
      a substantially horizontal lower peripheral edge;
   a set of glass sheets attached to the door frame;
   a substantially horizontal support member connected to the peripheral edge opposite the attachment edge, the support member being sized and positioned to minimize visual obstruction of an operator seated in the operator cab looking through the door;
   an upper hinge connection area in proximity to the substantially vertical peripheral edge on the attachment side of the door;
   a lower hinge connection area in proximity to the substantially vertical peripheral edge on the attachment side of the door;
   a first hinge connected to the upper hinge connection area and to the operator cab and a second hinge connected to the lower hinge connection area and to the operator cab, whereby the door frame can rotate about a substantially vertical axis adjacent to and parallel with substantially vertical peripheral edge on the attachment side of the door;
   a catch assembly comprising a knob on the door and a bracket connected to the cab, the bracket configured to engage with the knob to thereby hold the door in an open position and to disengage from the knob to facilitate closing the door;
   a door handle connected to the door in proximity to the peripheral edge opposite the attachment edge on the swinging-open side of the door;
   a vertical operator handlebar connected to the door frame and providing structural strength to the door frame, the vertical operator handlebar positioned in proximity to the substantially vertical peripheral edge on the attachment side of the door so as to not visually obscure sight through the door on more than about 30% of the total planar surface area of the door; and
   a horizontal operator handlebar connected to the door frame and providing structural strength to the door frame, the horizontal operator handlebar positioned in proximity to the support member so as to not visually obscure sight through the door more than the support member.

2. A door according to claim 1, wherein the door frame does not substantially deform when the door is in the open position and the knob is engaged with the bracket, upon exposure to wind having a speed of about 80 kph that is blowing in a direction substantially parallel to the door opening of the operator compartment.

3. A door according to claim 1, wherein the knob comprises a pin having a head portion and a neck portion, and wherein the bracket comprises a collar that is configured to engage with the head and neck portions of the pin to thereby hold the door in an open position and to disengage from the knob when the head and neck portions of the pin are released from the collar to thereby close the door.

4. A door according to claim 3, further comprising a catch release lever that is connected to the pin such that depression of the lever moves the collar from engaging the head and neck portions of the pin to disengaging the head and neck portions of the pin, to thereby separate the knob from the bracket.

5. A door according to claim 4, wherein the vertical operator handlebar comprises the catch release lever.

6. A door according to claim 1, wherein an opening angle of the door, when the door is in the open position and the knob is engaged with the bracket, is between about 155 degrees and about 165 degrees.

7. A door according to claim 1, wherein the view from the operator compartment through the door when the door is in a closed position, is unobstructed over about 75% of the total planar surface area of the door.

8. A door according to claim 1, wherein the view from the operator compartment through the door when the door is in a closed position, is unobstructed over about 85% of the total planar surface area of the door.

9. A door according to claim 1, wherein the door further comprises a sliding window comprising glass and a window actuator, the window positioned vertically between the upper hinge and the lower hinge of the door casing, and wherein the window actuator is accessible from the operator compartment to slidably move the window in a substantially horizontal direction that is parallel with the substantially horizontal upper peripheral edge of the door frame, to open or close the window.

10. A door according to claim 1, wherein the glass is tempered and has a thickness between about 3 and about 10 millimeters.

11. A door according to claim 1, wherein the door frame is steel.

12. A door according to claim 1, wherein the door frame comprises a hollow core that is generally rectangular in shape when the frame is viewed in cross-section, the hollow core having a height that is between about 32 and 36 millimeters and a width that is between about 8 and 21 millimeters; and a groove that extends from an edge of the hollow core and that terminates in a retaining lip, the retaining lip having a length between about 5 and 15 millimeters.

13. A door according to claim 10, wherein the ratio of the thickness of the door frame wall and the thickness of the glass is between 1:1 and 1:5.

14. A lift truck comprising:
a cab comprising a cab frame and an operator compartment, the cab frame having an opening for a door;
a door sized and shaped to fit in the opening of the cab frame, the door comprising:
a door frame defining periphery edges of the door, the door frame comprising:
a substantially vertical peripheral attachment edge on an attachment side of the door;
a peripheral edge opposite the attachment edge and on a swinging-open side of the door;
a substantially horizontal upper peripheral edge; and
a substantially horizontal lower peripheral edge;
a substantially horizontal support member connected to the peripheral edge opposite the attachment edge
a set of glass sheets attached to the door frame;
an upper hinge connecting the attachment side of the door to the operator cab; and
a lower hinge connecting the attachment side of the door to the operator cab;
a catch assembly comprising a knob on the door and a bracket connected to the cab frame, the bracket configured to engage with the knob to thereby hold the door in an open position and to disengage from the knob to facilitate closing the door;
a door handle connected to the door in proximity to the peripheral edge opposite the attachment edge on the swinging-open side of the door;
a vertical operator handlebar connected to the door frame and providing structural strength to the door frame; and
a horizontal operator handlebar connected to the door frame and providing structural strength to the door frame.

15. A lift truck according to claim 14, wherein the view from the operator compartment through the door when the door is in a closed position, is unobstructed over about 85% of the total planar surface area of the door.

16. A lift truck according to claim 14, wherein the lift truck has a lift capacity between about 8 and about 52 tons.

17. A lift truck according to claim 14, wherein the cab comprises a second opening for a second door, and wherein the second door is a mirrored version of the door set forth in claim 14.

18. A lift truck according to claim 17, wherein the door and the second door are left and right doors.

19. A lift truck according to claim 14, wherein the door does not substantially deform when the door is in the open position and the knob is engaged with the bracket, upon exposure to wind having a speed of about 80 kph that is blowing in a direction substantially parallel to the door opening of the operator compartment.

20. A lift truck according to claim 14, wherein the knob comprises a pin having a head portion and a neck portion, and wherein the bracket comprises a collar that is configured to engage with the head and neck portions of the pin to thereby hold the door in an open position and to disengage from the knob when the head and neck portions of the pin are released from the collar to thereby close the door.

21. A lift truck according to claim 20, further comprising a catch release lever that is connected to the pin such that depression of the lever moves the collar from engaging the head and neck portions of the pin to disengaging the head and neck portions of the pin, to thereby separate the knob from the bracket.

22. A lift truck according to claim 21, wherein the vertical operator handlebar comprises the catch release lever.

23. A lift truck according to claim 14, wherein an opening angle of the door, when the door is in the open position and the knob is engaged with the bracket, is between about 155 degrees and about 165 degrees.

24. A lift truck according to claim 14, wherein the view from the operator compartment through the door when the door is in a closed position, is unobstructed over about 75% of the total planar surface area of the door.

25. A lift truck according to claim 14, wherein the view from the operator compartment through the door when the door is in a closed position, is unobstructed over about 85% of the total planar surface area of the door.

26. A lift truck according to claim 14, wherein the door further comprises a sliding window comprising glass and a window actuator, the window positioned vertically between the upper hinge and the lower hinge of the door casing, and wherein the window actuator is accessible from the operator compartment to slidably move the window in a substantially horizontal direction that is parallel with the substantially horizontal upper peripheral edge of the door frame, to open or close the window.

27. A lift truck according to claim 14, wherein the set of glass sheets comprises tempered glass and has a thickness between about 3 and about 10 millimeters.

28. A lift truck according to claim 14, wherein the door frame is steel.

29. A lift truck according to claim 14, wherein the door frame comprises a hollow core that is generally rectangular in shape when the frame is viewed in cross-section, the hollow core having a height that is between about 32 and 36 millimeters and a width that is between about 8 and 21 millimeters; and a groove that extends from an edge of the hollow core and that terminates in a retaining lip, the retaining lip having a length between about 5 and 15 millimeters.

30. A lift truck according to claim 29, wherein the ratio of the thickness of the door frame wall and the thickness of the glass is between 1:1 and 1:5.

\* \* \* \* \*

UNITED STATES PATENT AND TRADEMARK OFFICE
CERTIFICATE OF CORRECTION

PATENT NO. : 11,376,929 B2
APPLICATION NO. : 16/709751
DATED : July 5, 2022
INVENTOR(S) : Pennings et al.

It is certified that error appears in the above-identified patent and that said Letters Patent is hereby corrected as shown below:

In the Specification

In Column 7, Line 32, delete "according" and insert --according to-- therefor.

In Column 7, Line 35, delete "according" and insert --according to-- therefor.

In Column 11, Line 4, delete "3 4," and insert --3, 4,-- therefor.

Signed and Sealed this
Third Day of September, 2024

Katherine Kelly Vidal
*Director of the United States Patent and Trademark Office*